United States Patent [19]

Kinoshita et al.

[11] Patent Number: 5,499,079
[45] Date of Patent: Mar. 12, 1996

[54] IMAGE DENSITY CONTROL APPARATUS AND METHOD FOR CONTROLLING IMAGE DENSITY ON A PHOTOCONDUCTOR SURFACE

[75] Inventors: Takeru Kinoshita; Takanobu Yamada, both of Toyokawa, Japan

[73] Assignee: Minolta Camera Kabushiki Kaisha, Osaka, Japan

[21] Appl. No.: 163,827

[22] Filed: Dec. 9, 1993

[30] Foreign Application Priority Data

Dec. 10, 1992 [JP] Japan ..................................... 4-353161
Nov. 26, 1993 [JP] Japan ..................................... 5-321067

[51] Int. Cl.$^6$ ........................... G03G 15/02; G03G 21/00
[52] U.S. Cl. ........................... 355/208; 355/214; 355/246
[58] Field of Search ..................................... 355/298, 246, 355/214

[56] References Cited

U.S. PATENT DOCUMENTS

| | | | |
|---|---|---|---|
| 5,206,686 | 4/1983 | Fukui et al. | 355/208 |
| 5,274,424 | 12/1993 | Hattori et al. | 355/208 |
| 5,305,057 | 4/1994 | Hattori et al. | 355/208 X |
| 5,311,215 | 5/1994 | Hattori et al. | 355/214 X |
| 5,343,233 | 8/1994 | Abe | 346/157 |

Primary Examiner—Fred L. Braun
Attorney, Agent, or Firm—Burns, Doane, Swecker & Mathis

[57] ABSTRACT

An image density control apparatus for controlling an image density on a photoconductor surface has a charger for charging the photoconductor surface uniformly. A laser beam is scanned over the photoconductor surface to form a standard latent image having an electric potential distribution on the photoconductor surface. A potential detector detects an electric potential distribution of the standard latent image, and a developer develops a standard toner image from the standard latent image. A density detector detects a density of the standard toner image. Based on the detected electric potential distribution and the detected density, an appropriate gradation correction data is selected. The appropriate gradation correction data is selected by first selecting a gradation correction table group in accordance with the detected electric potential distribution and second selecting a gradation correction data from the gradation correction table group in accordance with the detected density.

9 Claims, 22 Drawing Sheets

DISTANCE IN SUBSCANNING DIRECTION (1/300 INCH)

Fig. 19a
Fig. 19b
LATENT IMAGE
POTENTIAL
DISTRIBUTION
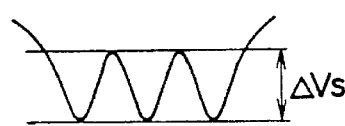
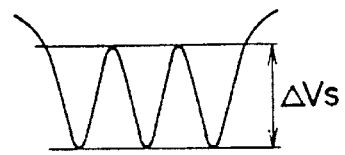
Fig. 20
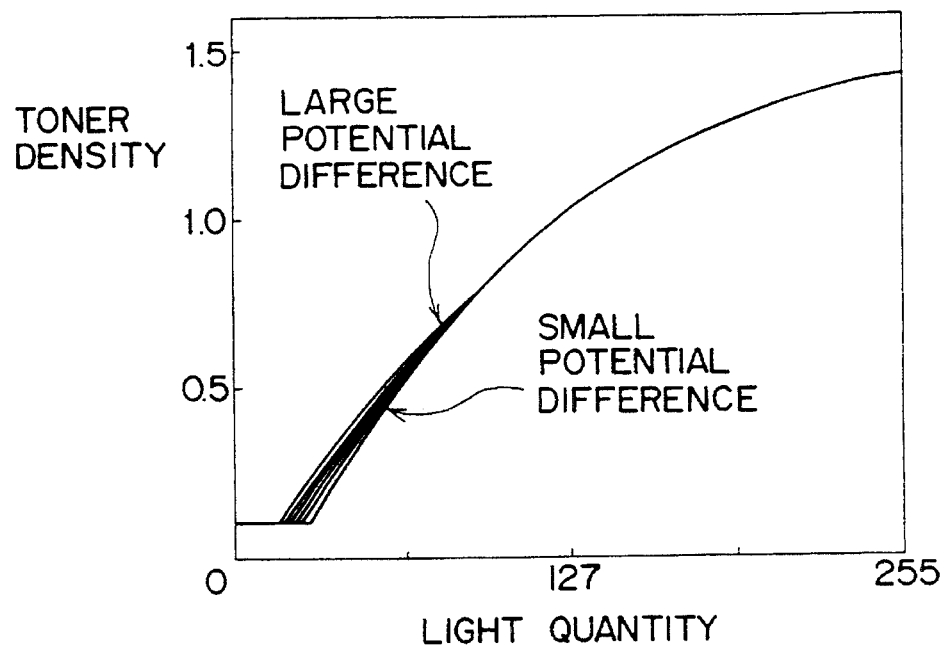

IMAGE DENSITY CONTROL APPARATUS AND METHOD FOR CONTROLLING IMAGE DENSITY ON A PHOTOCONDUCTOR SURFACE

BACKGROUND OF THE INVENTION

1. Field of the Invention

The present invention relates to an apparatus for detecting an electric potential distribution on a photoconductor caused by a laser beam exposure, and also to an image density control apparatus for executing AIDC by using the result of the detection of the electric potential distribution.

2. Description of the Prior Art

The present inventor has previously disclosed in Japanese patent laid-open number 4-271779 an imaging method that compensates for changes in gradation characteristics when the beam diameter of the laser beam varies due to changing the laser diode. The previous method changes the maximum strength of the laser beam according to the beam diameter after laser diode replacement, or changes the γ tables (tables of gradation correction data) according to the beam diameter after laser diode replacement.

In light intensity modulation methods achieving a gradation display by varying the laser light quantity in plural steps, an exposure distribution as shown in FIG. 1 occurs in subscanning direction y. The main scanning direction x and exposure i are also shown in FIG. 1.

The exposure distribution ρ (i,x,y) is obtained as $$\rho(i,x,y) = i\rho_a(y) \qquad (1)$$

where the normalized light quantity distribution in the subscanning direction is $r_a$ and the average light quantity is i. Sample results obtained with this equation are graphed in FIG. 2.

The potential distribution (attenuation potential) V(i,y) of the electrostatic latent image formed on the photoconductor by exposure at the above light distribution $i\rho_a$ (y) is obtained by equation (2) below.

$$\begin{aligned} V(i,y) &= F(i\rho_a(y)) \\ &= (V0 - VR)\exp(-i\rho_a(y)/k) + VR \end{aligned} \qquad (2)$$

where V0 is the charge potential, VR is the residual potential, and k is the sensitivity constant. Sample results obtained with this equation are graphed in FIG. 3.

In a light intensity modulation gradation display, there is a specific exposure distribution in the subscanning direction y as described above, resulting in display problems as illustrated in FIGS. 4–7.

FIG. 4 shows the correlation between the potential distribution of each latent image when the laser beam diameter is large (left side of figure) and small (right side), and the amount of toner adhering to the photoconductor by development of the latent image at developer potential VB when the average exposure i level is low (low image density). Note that the toner quantity is proportional to the difference between the developer potential VB and the attenuation potential (the potential of the latent image).

From FIG. 4 it is understood that toner adheres more easily to the photoconductor at a low exposure i because the potential valley is deeper with a small diameter laser beam. In other words, toner adhesion to the photoconductor begins at a lower average exposure i.

FIG. 5 shows the correlation between the potential distribution of each latent image when the laser beam diameter is large (left side of figure) and small (right side), and the amount of toner adhering to the photoconductor by development of the latent image at developer potential VB when the average exposure i level is high (high image density).

From FIG. 5 it is understood that in the high average exposure i region toner easily adheres uniformly when a large diameter laser beam is used because potential valleys do not occur easily, but that overall toner adhesion decreases when the laser beam diameter is small because potential valleys occur easily.

The characteristics shown in FIGS. 4 and 5 are graphed in FIG. 6. FIG. 6 plots the relationship between toner density (adhesion) and exposure (light quantity) when the beam diameter W½ is varied in seven levels at 5 μm increments from 45–75 μm. The axis of abscissas in FIG. 6 shows the 256 gradation light levels assuming a maximum light level set to a known value, and the axis of ordinates shows the toner density (toner adhesion).

From FIG. 6 it is understood that toner adhesion can be varied by adjusting the beam diameter W½ while maintaining a constant (same) light quantity (same average exposure i) under certain conditions. In other words, toner density increases when the light quantity is low and the beam diameter W½ is small because toner adhesion occurs even at relatively low exposure levels with a small beam diameter as shown in FIG. 4. When the exposure level is high and the beam diameter W½ is large, toner density also increases because toner adheres to the overall image when the beam diameter W½ is large as shown in FIG. 5. It is to be noted that toner density is essentially unchanged irrespective of the beam diameter W½ at intermediate gradation levels around an exposure (light quantity) level of 72.

The relationship between toner density and light quantity adjusted in 256 gradations is shown in FIG. 7 assuming the maximum toner adhesion is controlled to a constant value by AIDC as described below. These curves are shown for the same beam diameters W½ used in FIG. 6.

From FIG. 7 it is understood that the difference in toner density caused by differences in beam diameter W½ is corrected by AIDC at high exposure (average exposure i) levels, but this difference in toner density is more pronounced at low exposure levels.

Thus, particularly with the light intensity modulation method, technologies correcting the variation in gradation characteristics as disclosed in Japanese patent laid-open number 4-271779 are available because the gradation characteristics are affected by the beam diameter W½. As indicated by the properties discussed with reference to FIGS. 4 and 5 above, however, the gradation characteristics are not varied simply by the change in beam diameter W½, but are more precisely varied by the change in the potential distribution of the latent image caused by differences in beam diameter W½.

Therefore, the method described in Japanese patent laid-open number 4-271779 cannot cope with differences in the potential distribution of the latent image occurring when the beam diameter W½ remains constant. FIG. 21b shows the potential distribution (dotted line in FIG. 21b) of the ideal latent image that should be formed when the photoconductor is exposed with a laser beam with a light quantity distribution as shown in FIG. 21a, and the potential distribution (solid line in FIG. 21b) of the latent image that is actually formed. There is an obvious difference between the two curves. This difference in potential distribution is caused by a difference in the light exposure diffusion due to surface condition of the photoconductor or by a difference in the charge diffusion due to a difference of the surface treatment. These differences occur individually from variations during photoconductor manufacture, environmental conditions, and deterioration of the photoconductor with use. It is not possible to treat sufficiently the problem by using only the gradation correction due to the a difference in the beam diameter.

FIGS. 19a and 19b show an electric potential distribution formed by an equal beam diameter. As mentioned above, in a case when there is a large amount of diffusion due to the difference in the surface condition of the photoconductor, the distribution shows a small potential difference ($\Delta Vs$) between the summit and the valley as shown in FIG. 19a. On the other hand, the distribution shows a large potential difference ($\Delta Vs$) when there is a small amount of diffusion as shown in FIG. 19b. Accordingly, there occurs a gradation variation due to an electric potential difference ($\Delta Vs$) between the summit and the valley in the potential distribution as shown in FIG. 20 in a similar way to that of gradation variation due to the beam difference as shown before. That is, in a case when the maximum density is made constant, a large amount of electric potential difference ($\Delta Vs$) permits the low density part rises up at an earlier time and a small amount of electric potential difference ($\Delta Vs$) permits the low density part rises up at an later time.

Therefore, in view of the problem mentioned above, the present invention is to achieve a good gradation display by compensating for changes in the gradation display due to differences in the electric potential difference caused by a difference in the beam diameter, light diffusion, or charge diffusion.

To achieve this object, an image density control apparatus according to the present invention comprises a means for forming a latent image having a potential distribution by scanning and exposing the surface of a uniformly charged photoconductor with a laser beam; a means for detecting the potential distribution of the latent image; a means for storing the potential distribution; a means for calculating a potential difference gap (potential difference between the max. and min.)

An image density control apparatus according to the present invention forms a standard latent image by means of a laser beam emitting a known light quantity to the surface of a photoconductor charged to a uniform potential by a charger controlled to a known grid potential; develops a toner image of this latent image by means of a developer controlled to a known developer potential; detects the density of this standard toner image; optimizes the image density during the final imaging process by controlling the grid potential and developer potential according to the density of this standard toner image; and comprises a means for detecting the electric potential distribution; a memory for storing the gradation correction data in accordance with each of plural potential distribution and in accordance with the each of densities of the toner image as a reference; a first selection means for selecting the gradation correction data group corresponding to the electric potential distribution (potential difference gap) detected by the potential distribution detection means; and a second selection means for selecting the table corresponding to the standard toner image density from the group of tables selected by the first selection means.

The electric potential distribution detector stores the electric potential distribution of the charge latent image formed on the photoconductor with the laser beam and then calculates the potential difference ($\Delta Vs$) between the max value (summit value) and the min. value (valley value) in accordance with the stored potential distribution.

The image density control apparatus manages the first selection means to select the gradation correction data corresponding to the potential difference ($\Delta Vs$) detected by the electric potential distribution detector. Next, the second selection means selects the gradation correction data corresponding to the detected density from the data group selected by the above first selecting means.

The image density is controlled based on the data obtained from these selected gradation correction data.

BRIEF DESCRIPTION OF THE DRAWINGS

The present invention will become more fully understood from the detailed description given below and the accompanying diagrams wherein:

FIGS. 19a and 19b are diagrams showing the method of calculating the laser beam diameter referencing the potential distribution, FIG. 20 is a diagram showing the method of calculating the laser beam diameter referencing the light attenuation curve.

DESCRIPTION OF PREFERRED EMBODIMENTS

The preferred embodiment of the present invention is described below in three parts: (I) configuration of a digital color copier, (II) control circuits and image signal processing in a photocopier, and (III) latent image potential distribution detection and image density control.

(I) CONFIGURATION OF A DIGITAL COLOR COPIER

Figure 8:
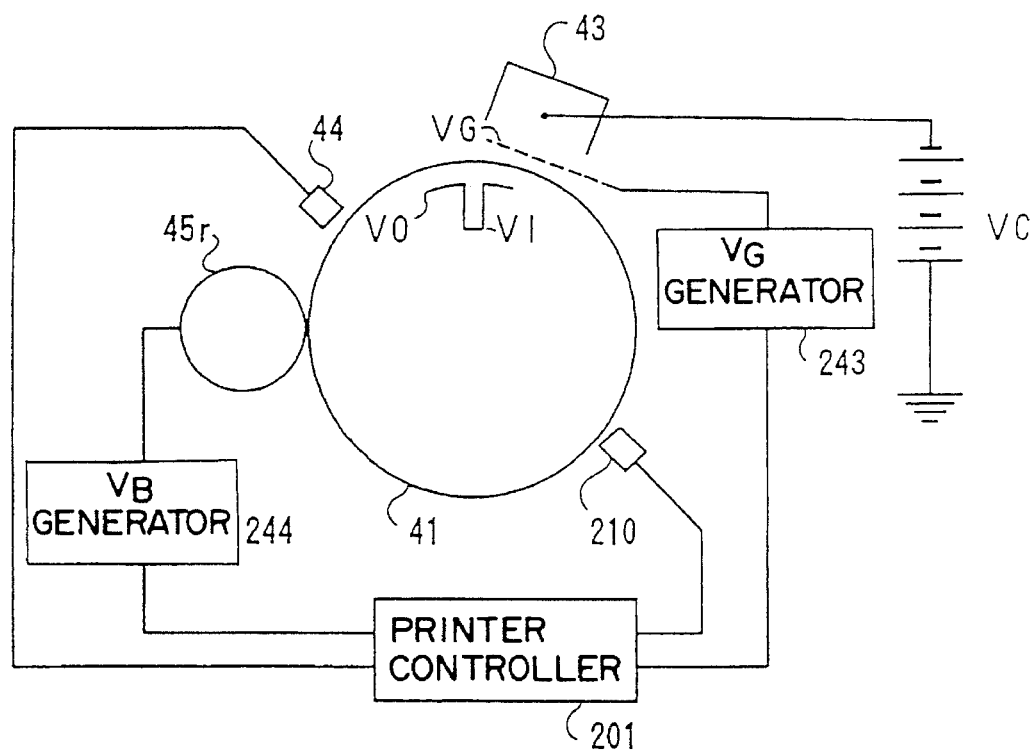
FIG. 8 is a block diagram showing the positions of the components of the present invention.

A digital color copier based on the present invention is described below with reference to FIGS. 22 and 8. The weak potential sensor 44 provided near the photoconductor 41 of this copier is described with reference to FIGS. 9 and 10.

(I-1) Outline of a Photocopier

Figure 22:
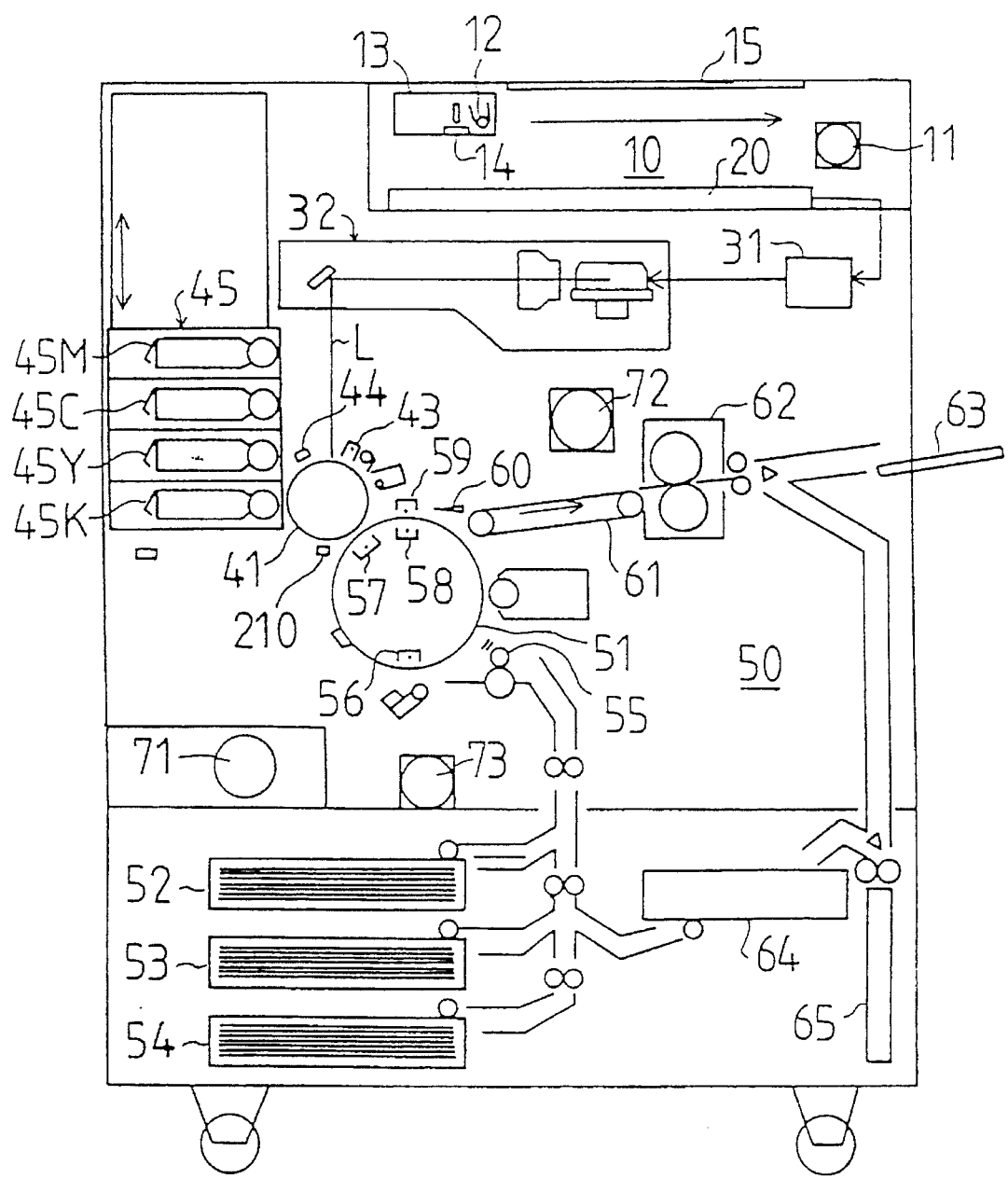
FIG. 22 is a diagram of a photocopier according to the embodiment of the present invention.

Broadly, this copier comprises an image reader 10 and an image recorder (printer) 50 (FIG. 22).

In the image reader 10, the original image is scanned and converted to an electrical signal, and the image data for laser diode drive is generated based on this electrical signal.

The original is placed face down (image-side down) on the document glass 15, and is then exposed and scanned by a scanner 13, which is moved by the drive power of the pulse motor 11. The image reflection is then photoelectrically converted to an electrical signal corresponding to the density of the original image by an image sensor (CCD) 14 provided on the scanner 13. This electrical signal is input to the image signal processor 20 and processed according to a predetermined program to generate the image data for laser diode drive. This image signal process is described below. The image data is then output to the print head controller 31.

In the image recorder 50, the electrostatic latent image written on the surface of the photoconductor 41 by the laser light L is developed with the toners (cyan C, magenta M, yellow Y, and black Bk) corresponding to the image colors, the toner colors are sequentially transferred to the copy paper wrapped to the transfer drum 51, and then fixed by thermal fusion of the toner in the fixing unit 62.

The laser light L is modulated according to the image data and output from the laser unit 32, which is controlled by the print head controller 31 to which the image data is input. The surface of the photoconductor 41, which rotates at a constant speed, is scanned in the axial direction (main scanning direction) thereof by the laser unit 32 emitting the modulated laser light L. This forms an electrostatic latent image corresponding to the image data on the photoconductor 41 surface. It should be noted that the photoconductor 41 is uniformly charged by the charger 43 located at a position upstream from the laser light L incidence point. This charge potential V0 is controlled based on the grid potential VG of the charger 43 as described in detail below.

Figure 24:
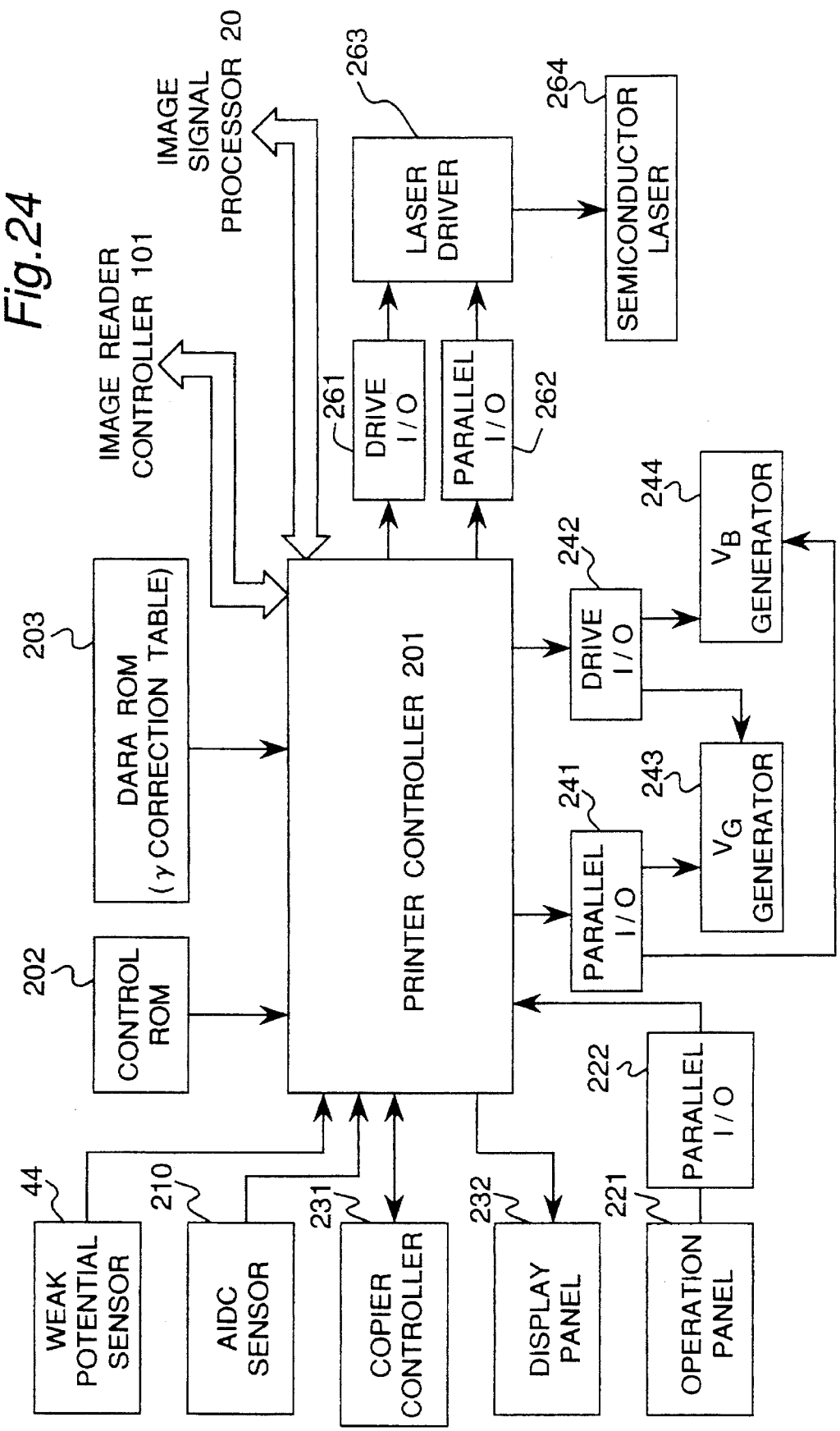
FIG. 24 is a block diagram of the control circuit for the image recorder in the above photocopier.

The electrostatic latent image formed on the photoconductor 41 is then developed into a visible image by one of the four developers (developer 45C for cyan toner, developer 45M for magenta toner, developer 45Y for yellow toner, developer 45K for black toner) provided in the developer unit 45. The developer used is selected by the printer controller 201 (see FIG. 24). The selected developer (developer 45r, FIG. 8) is moved vertically relative to the developer unit 45 controlling the developing position by the drive power of the developer unit motor 71, which is controlled by the copier controller 231 (FIG. 24). The weak potential sensor 44 is provided upstream from the developing position, and AIDC sensor 210 is provided downstream. These sensors are described in detail below.

The developed, visible toner image is then transferred to the copy paper wrapped onto the transfer drum 51 by the attractive force produced by the transfer charger 57. The paper is taken from one of the three paper trays 52–54 or from the internal holding tray 64, and transported by the transport rollers to the timing roller pair 55. At the predetermined timing, the paper is then wrapped to the transfer drum 51. The attraction charger 56 for holding the paper to the transfer drum 51, and the separation chargers 58, 59 and separation claw 60 separating the paper from the transfer drum 51 are also shown in FIG. 22. Note, also, that the photoconductor 41 and transfer drum 51 are synchronously driven by the drum drive motor 72.

The paper to which a maximum four color (during full color copying) toner image has been transferred is then separated from the transfer drum 51 and transported to the fixing unit 62 by the transport belt 61. After the image fixing process, whereby the toner image is thermally fused to the paper by the fixing unit 62, the paper is ejected to the copy tray 63 outside the copier, or to the internal holding tray 64. Note that if the paper is reversed by a reversing unit 65 before being deposited in the internal holding tray 64, the next image is formed on the reverse side of the copy paper, thus enabling duplex copying/printing. Note, also, that the transport rollers, transport belt 61, and other mechanical components are driven by the main motor 73.

(I-2) Weak Potential Sensor 44

As described above, a weak potential sensor 44 for detecting weak potentials on the photoconductor 41 surface are provided upstream of the developing position (the position of the selected developer unit 45r; FIG. 8) and downstream of the exposure position. As described in Journal of Static Electric Society, Oct. 4, 1986 issue pp 217 to 224 and Dec. 3, 1988 issue pp 210 to 215, this weak potential sensor 44 comprises a small diameter measuring electrode, a small diameter insulation layer surrounding the measuring electrode, and a guard electrode surrounding the insulation layer.

Figure 9:
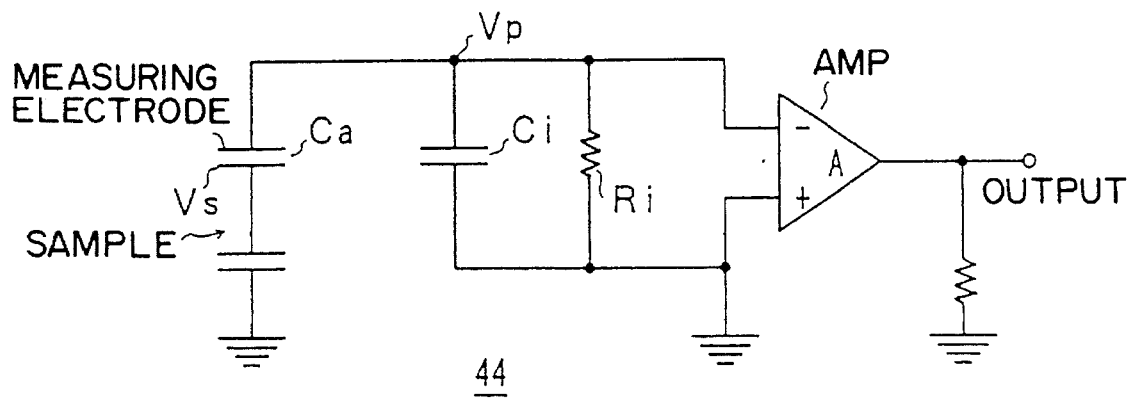
FIG. 9 is an equivalent circuit diagram of the weak potential sensor.
Figure 10:
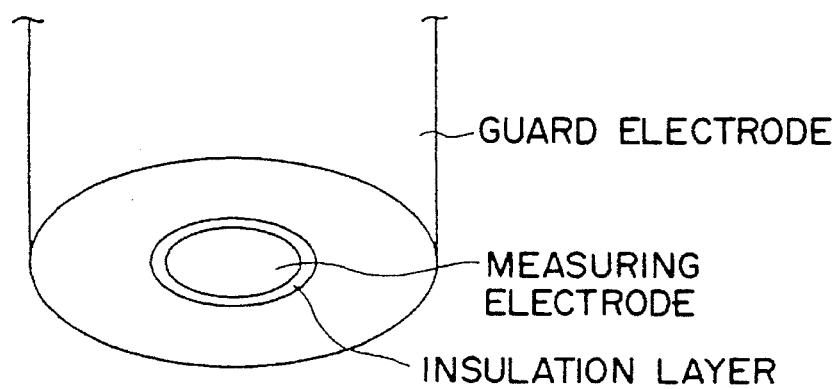
FIG. 10 is a perspective view showing the outside of the weak potential sensor.

As shown in the equivalent circuit diagram in FIG. 9, the measuring electrode of the weak potential sensor 44 is placed in proximity to the surface of the sample (photoconductor 41) charged to a voltage Vs, the charge induced by the electrostatic induction of static capacitance Ca is converted by measuring capacitor Ci to a voltage, and the voltage is amplified by a high input impedance amplifier.

In FIG. 9, the voltage Vp can be obtained from equation (4) because equation (3) is true if the charge/discharge resistance Ri is sufficiently high.

$$CiVp = Ca(Vp - Vs) \quad (3)$$

$$Vp = (Ca/(Ca - Ci))Vs \quad (4)$$

(II) CONTROL CIRCUITS AND IMAGE SIGNAL PROCESSING IN A PHOTOCOPIER

The control circuits and image processing operations of the copier described above are described next with reference to FIGS. 23–26. The major components of the image reader 10, image recorder 50, image signal processing procedure, and image reader 10 are shown in FIGS. 23, 24, 25, and 26, respectively.

Figure 23:
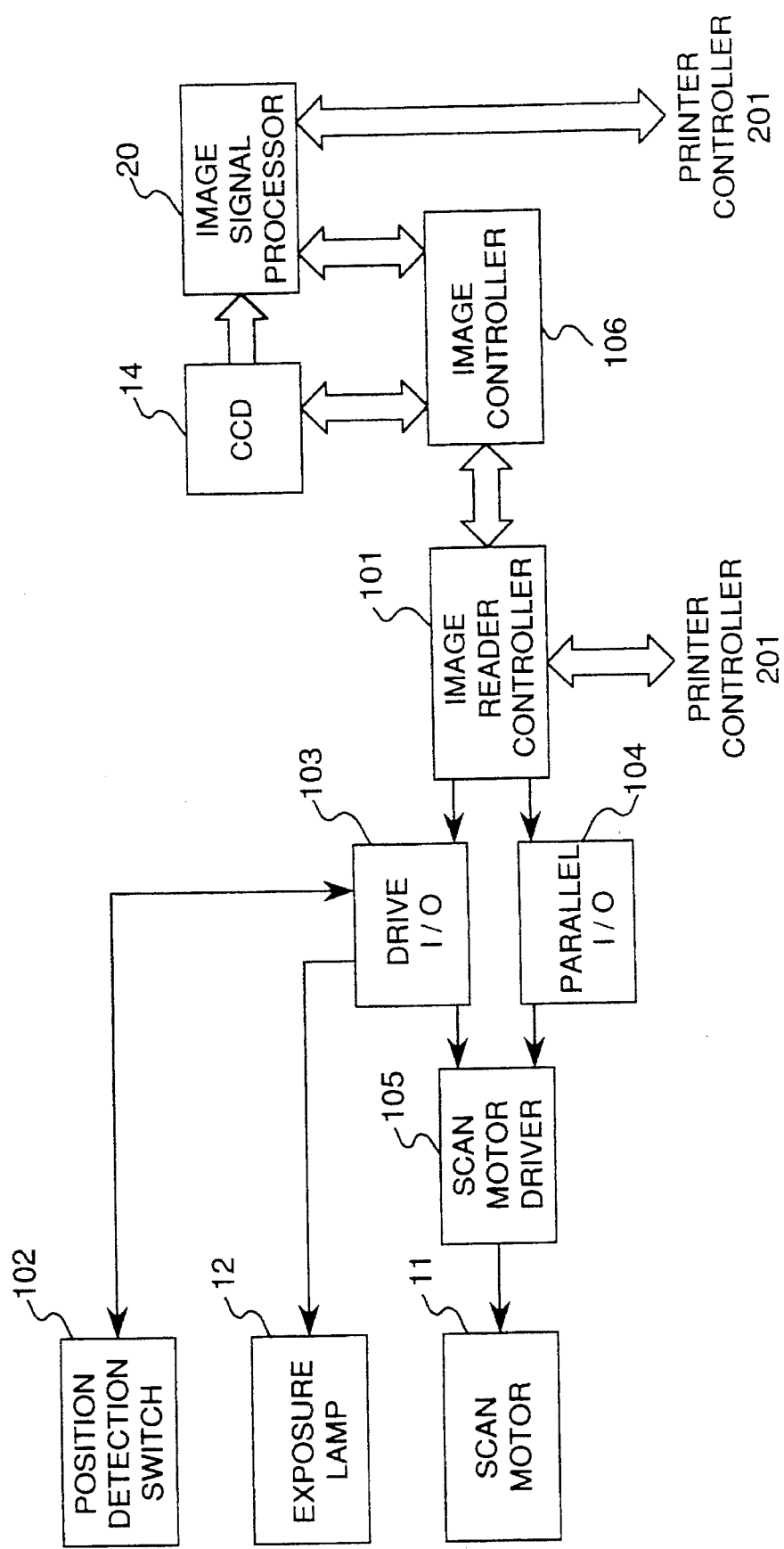
FIG. 23 is a block diagram of the control circuit for the image scanner in the above photocopier.

The image reader 10 is controlled by the image reader controller 101 shown in FIG. 23. Specifically, the image reader controller 101 controls turning the exposure lamp 12 in the scanner 13 on/off via the drive input/output interface 103, and controls the scan motor driver 105 for driving the pulse motor 11 through the drive I/O interface 103 and parallel I/O interface 104. The detection signal from the position detection switch 102, which detects whether the scanner 13 is in the predetermined position, is also input to the image reader controller 101 through the drive I/O interface 103.

Figure 25:
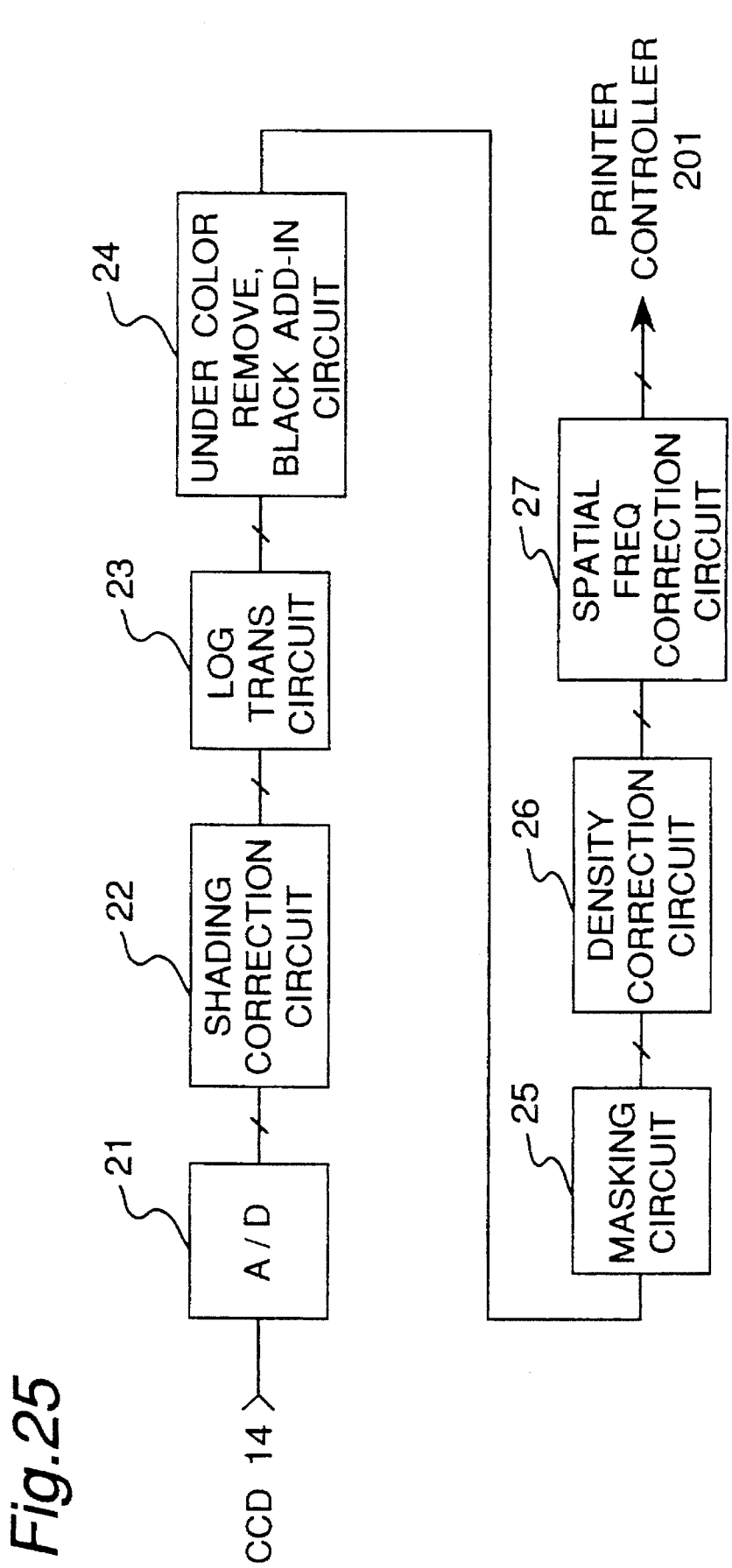
FIG. 25 is a block diagram of the image signal processing operation of the image scanner in the above photocopier.

The image reader controller 101 is connected to the image controller 106. The image controller 106 is connected to the CCD 14 mounted in the scanner 13 and to the image signal processor 20, and controls the image signal processing sequence of the image signal processor 20 as shown in FIG. 25.

Specifically, the image signal output from the CCD 14 is first converted to multivalued RGB image data by the A/D converter 21. After shading correction by the shading correction circuit 22, the signal is then converted to image density data by the log transformation circuit 23. Excessive black coloring is then removed by the under color remove, black add-in circuit 24, and true black data is generated from the RGB data. Sequential YMCK masking is then applied by the masking circuit 25, after which correction processing applying a predetermined coefficient to the data is executed by the density correction circuit 26. The spatial frequency correction circuit 27 applies the final processing before the data is sent to the printer controller 201 (FIG. 24).

The image recorder 50 is controlled by the printer controller 201 shown in FIG. 24. The CPU in this printer controller 201 executes the processes shown in FIGS. 27–31 (described below) according to the program stored in the control ROM 202.

The detection signals from the weak potential sensor 44, AIDC sensor 210, and other sensors, and the control signals from the operation panel 221 are input to the printer controller 201 for it to function.

The γ tables for gradation correction and the tables described below are stored to the data ROM 203. These tables are either selected or referenced for the image processing operations.

The printer controller 201 outputs a control signal through the parallel I/O interface 241 and drive I/O interface 242 to the VG potential generator 243 for generating the grid potential VG of the charger 43. The printer controller 201 also outputs a control signal to the VB potential generator 244 for generating the developer potential VB of the developer unit 45r set at the developing position. A control signal is also output through parallel I/O interface 262 and drive I/O interface 261 to the semiconductor laser driver 263 for driving the semiconductor laser 264 in the laser unit 32. It is to be noted that a gradation display is achieved by modulating the emission strength of the semiconductor laser 264. In addition, when control signals are output to the display panel 232, the printer controller 201 also communicates with the copier controller 231 for copying operation control.

Figure 26:
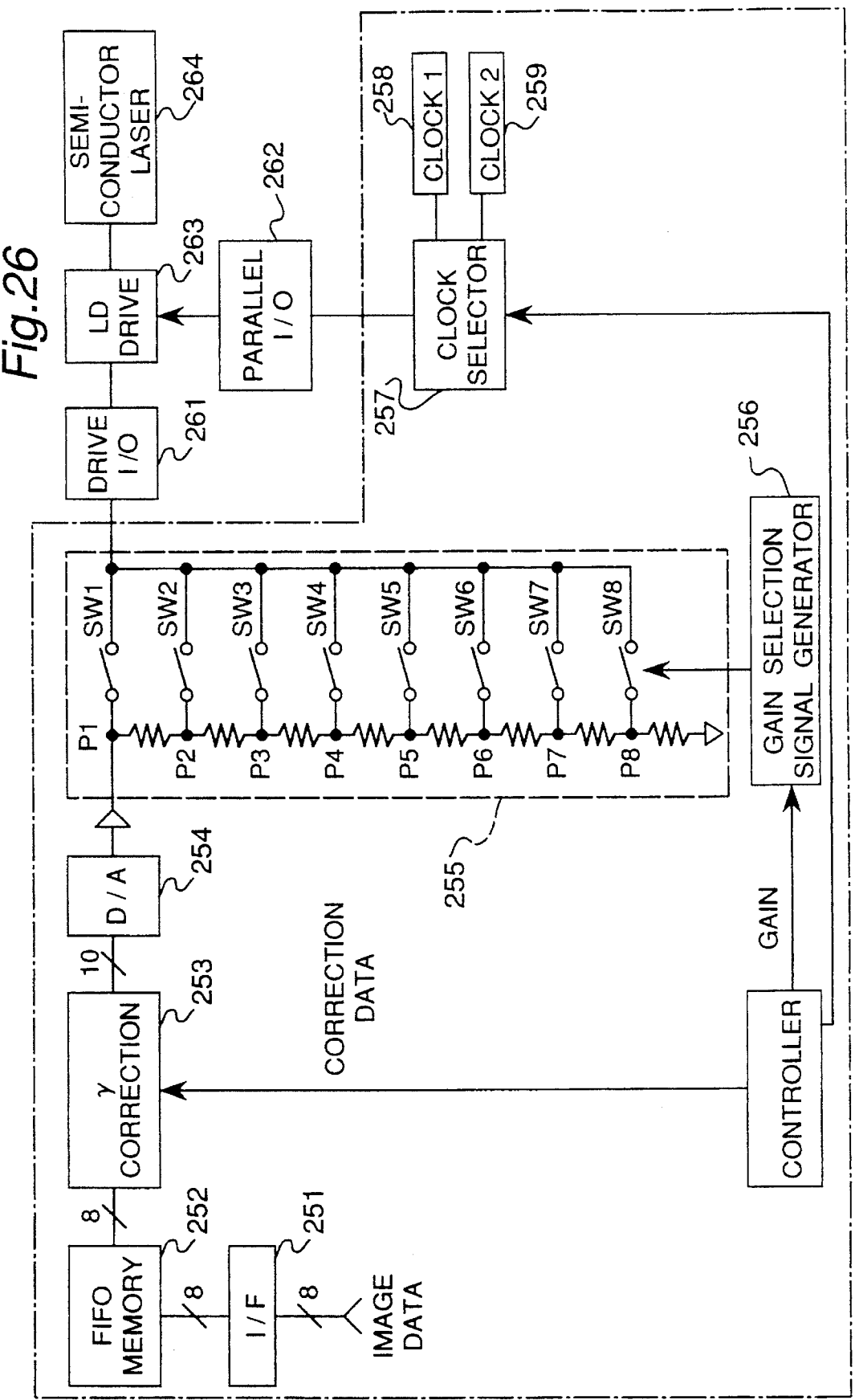
FIG. 26 is a block diagram showing a detail of the printer controller in the above photocopier.

The image data processing sequence of the printer controller 201 is described below with reference to FIG. 26.

The 8-bit image data from the image signal processor 20 is first input through the interface 251 to the first-in, first-out (FIFO) memory 252. The FIFO memory 252 is a line buffer memory storing the gradation data for a specified number of lines in the main scanning direction, and is used to absorb differences in the operating clock frequencies of the image reader 10 and image recorder 50.

The image data from the FIFO memory 252 is input to the γ corrector 253. The γ correction data selected by the beam diameter calculation process (FIG. 30) and the AIDC operation process (FIG. 31) is referenced by the γ corrector 253 to apply the appropriate γ correction to the input data. The result is output to the digital/analog (D/A) converter 254.

The analog voltage signal output from the D/A converter 254 is amplified by the gain set by the switches SW1–SW8 (corresponding to power levels P1–P8), which are switched according to the selection signal generated by the gain selection signal generator 256 according to the gain setting from the CPU. The amplified analog voltage signal is then output through the drive I/O interface 261 to the semiconductor laser driver 263. The semiconductor laser 264 thus emits a beam at the corresponding intensity level. Either clock 1 or clock 2 is input through the parallel I/O interface 262 to the semiconductor laser driver 263 as selected by the clock selector 257.

(III) LATENT IMAGE POTENTIAL DISTRIBUTION DETECTION AND IMAGE DENSITY CONTROL

The processes executed by the printer controller 201 are described next with reference to the flow diagrams shown in FIGS. 27–31.

Figure 27:
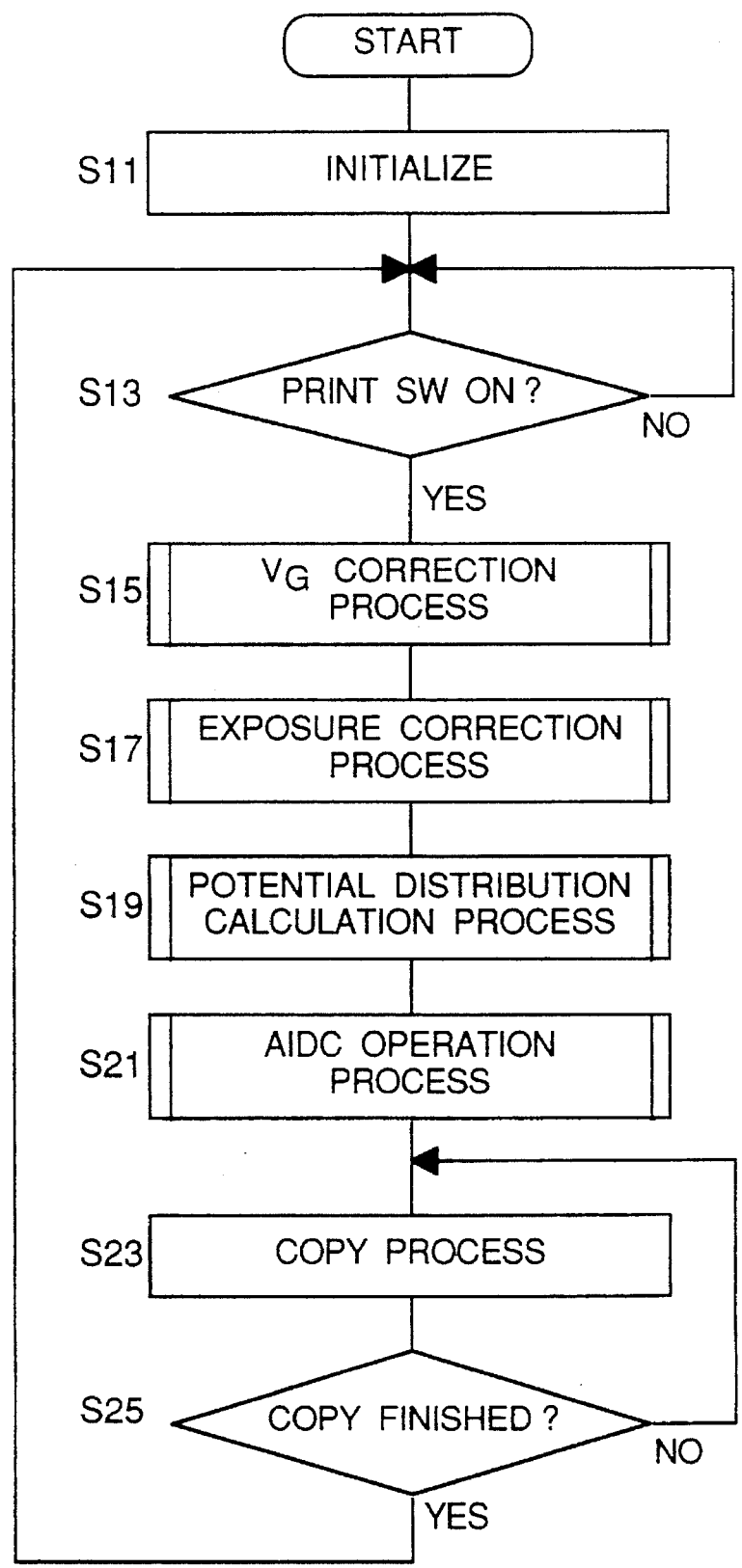
FIG. 27 is a flow chart of the process executed by the CPU in the above photocopier.
Figure 28:
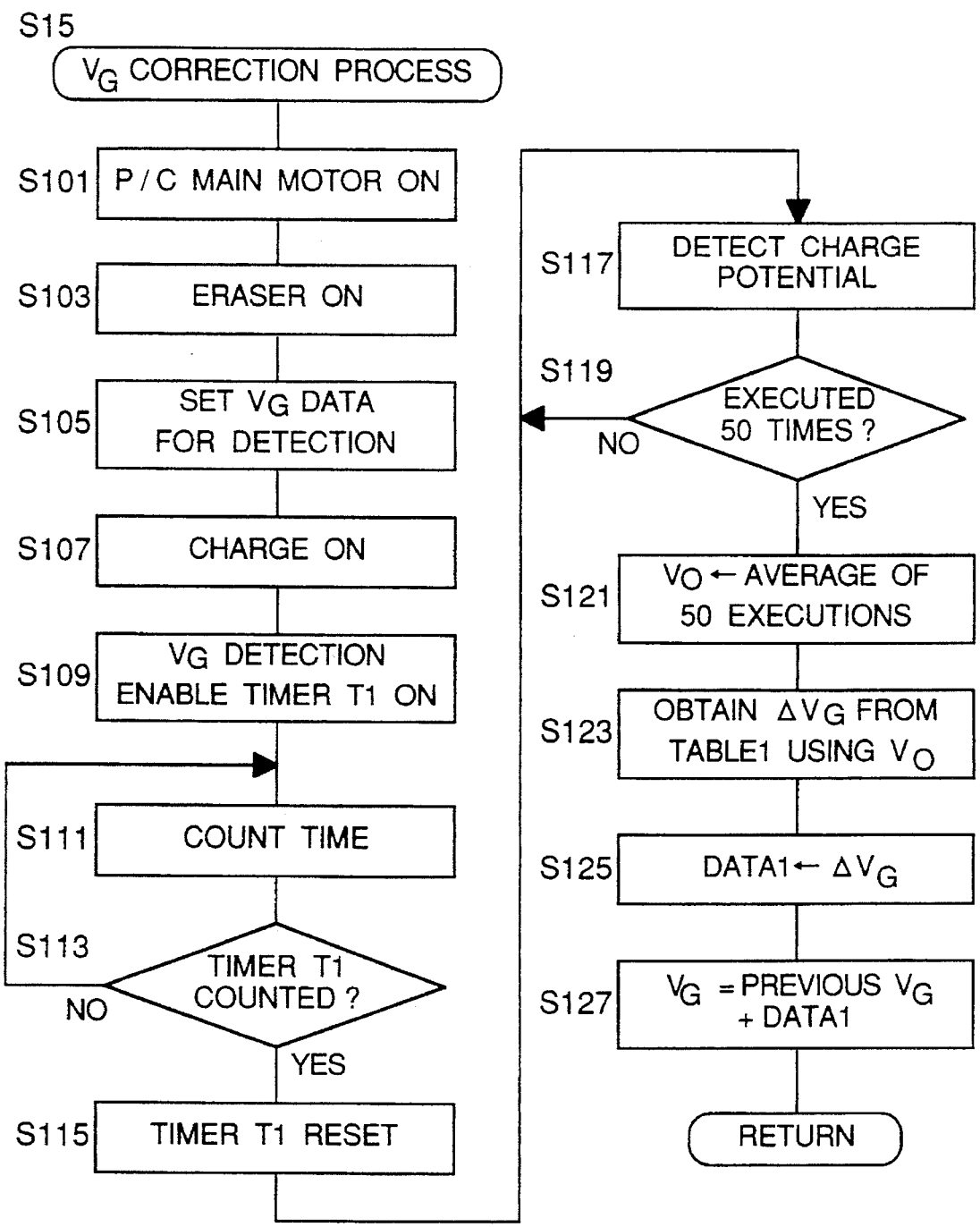
FIG. 28 is a flow chart of the grid potential VG correction process in FIG. 27.
Figure 29:
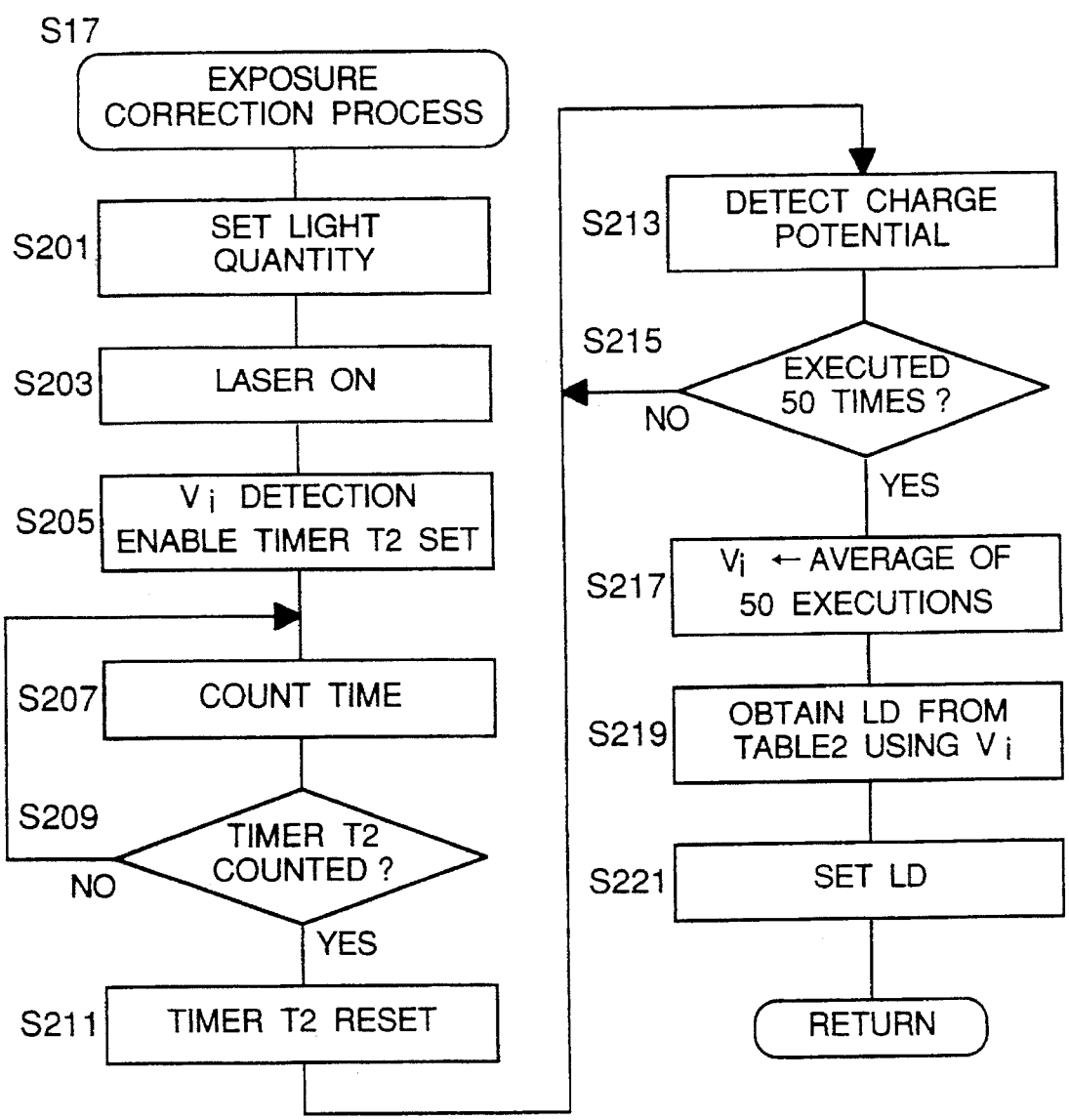
FIG. 29 is a flow chart of the exposure correction process in FIG. 27.
Figure 30:
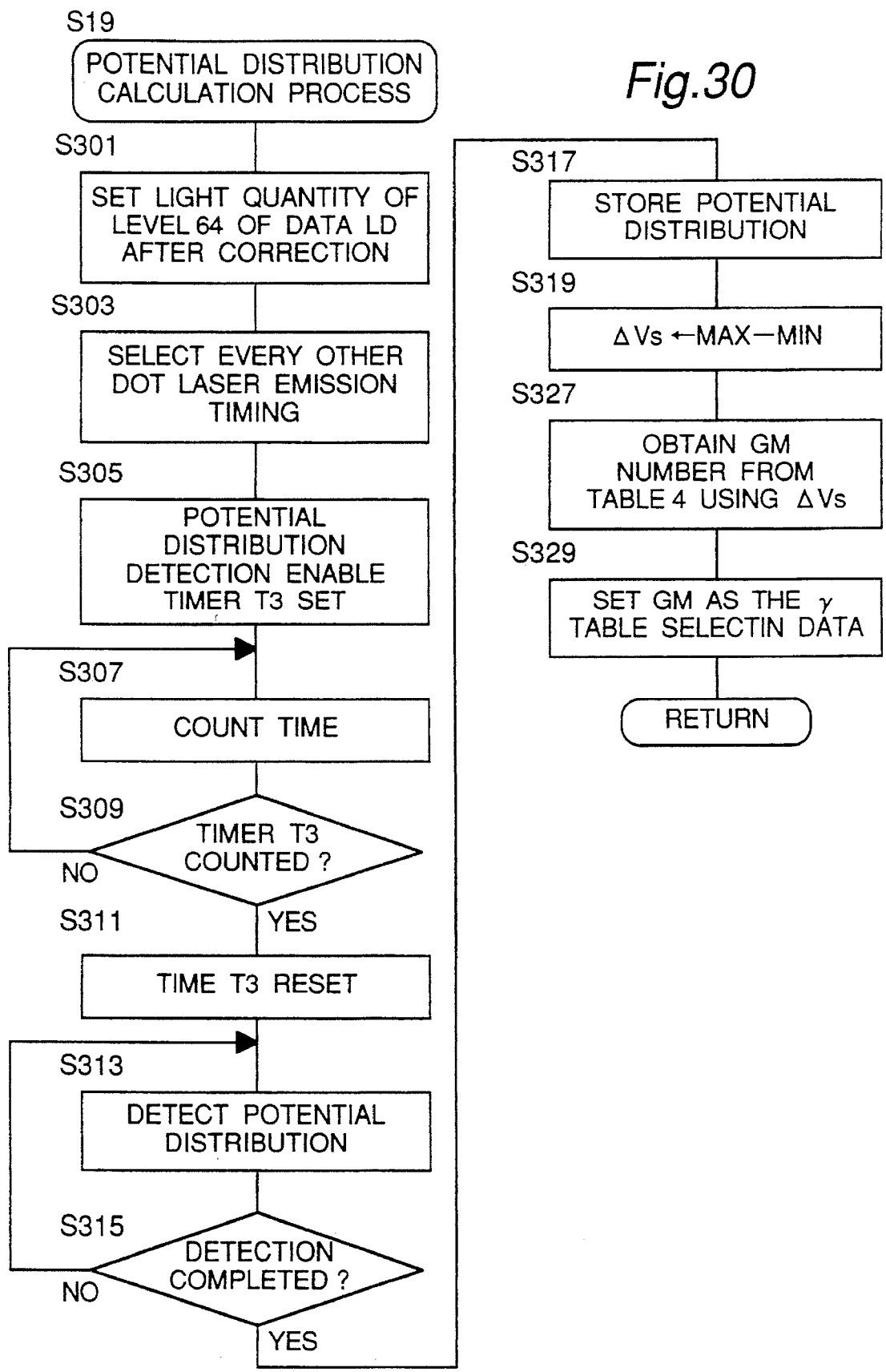
FIG. 30 is a flow chart of the potential distribution calculation process in FIG. 27.
Figure 31:
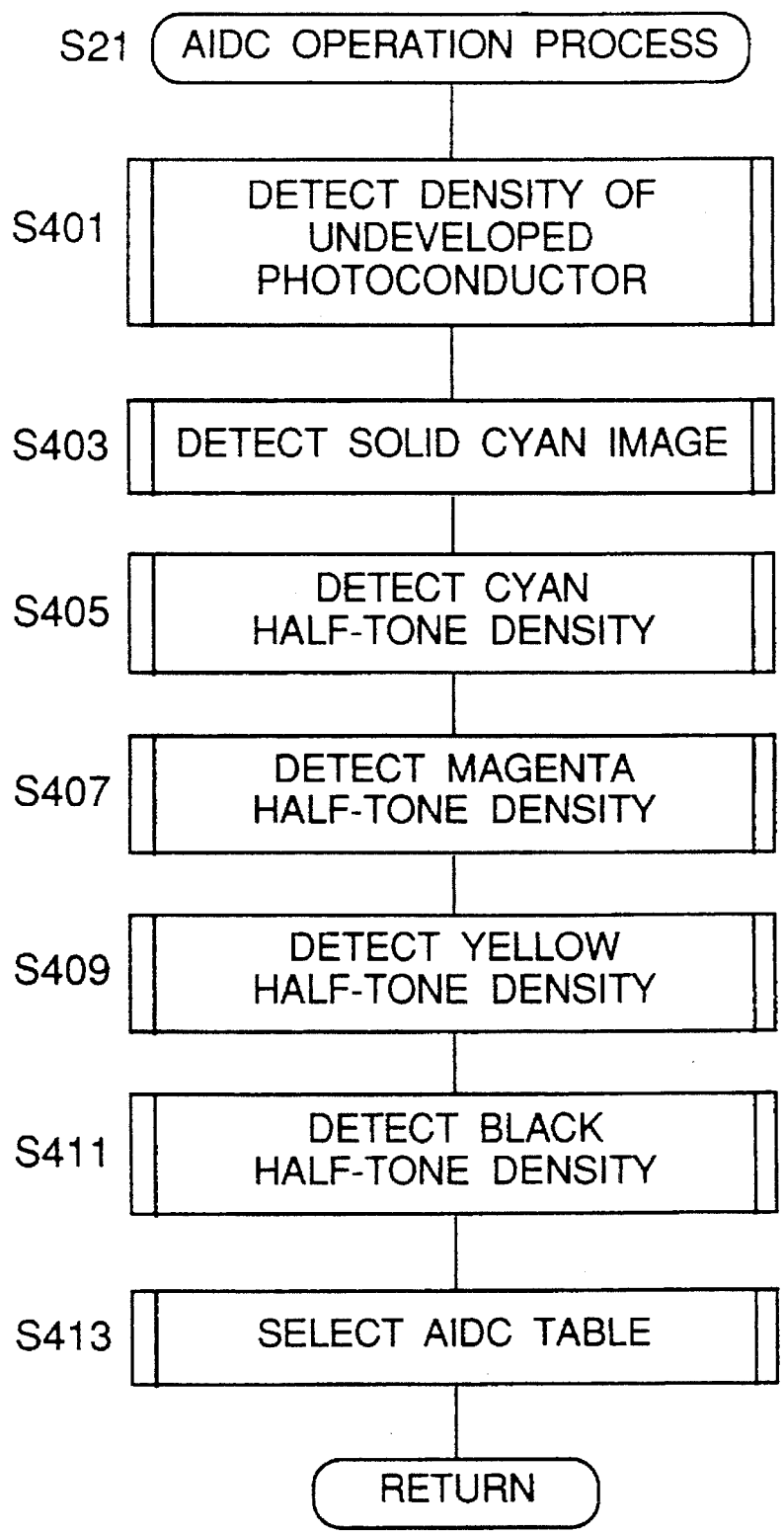
FIG. 31 is a flow chart of the AIDC operation in FIG. 27.

The main routine executed by the printer controller 201 is shown in FIG. 27. The VG correction process S15, exposure correction process S17, beam diameter calculation process S19, and the AIDC operation process S21 subroutines shown in FIG. 27 are shown in FIGS. 28–31, respectively.

(III-1) Main routine

The main routine executed by the printer controller 201 CPU starts with the initialization process S11 when, for example, the copier power is turned on. When initialization is completed, the copier is in the standby mode and the print switch on the operation panel is operable. When the print switch is operated and becomes ON (S13 returns YES), the following subroutines are executed starting with the VG correction process S15.

VG CORRECTION PROCESS S15

The charge potential of the photoconductor 41 should be set to the desired potential V0 corresponding to the grid potential VG by controlling the grid potential VG of the charger 43.

Figure 12:
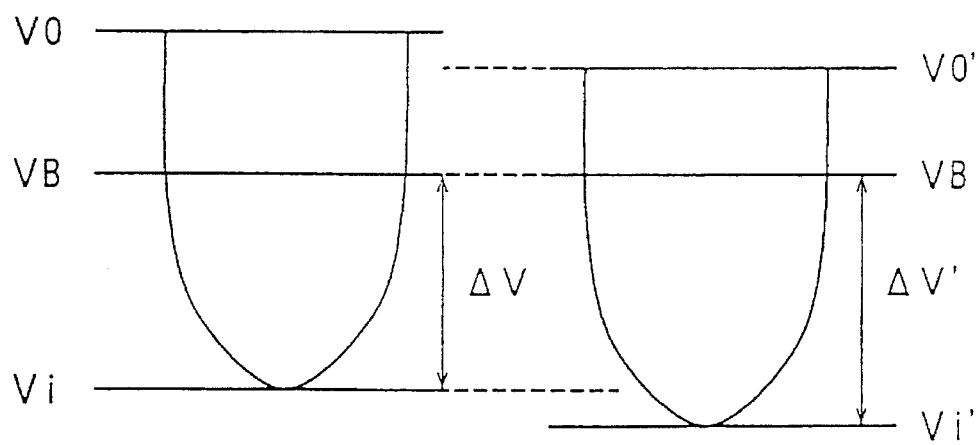
FIG. 12 is a graph showing that the attenuation potential of a constant exposure level will also vary when the grid potential is constant but the charge potential varies.
Figure 13:
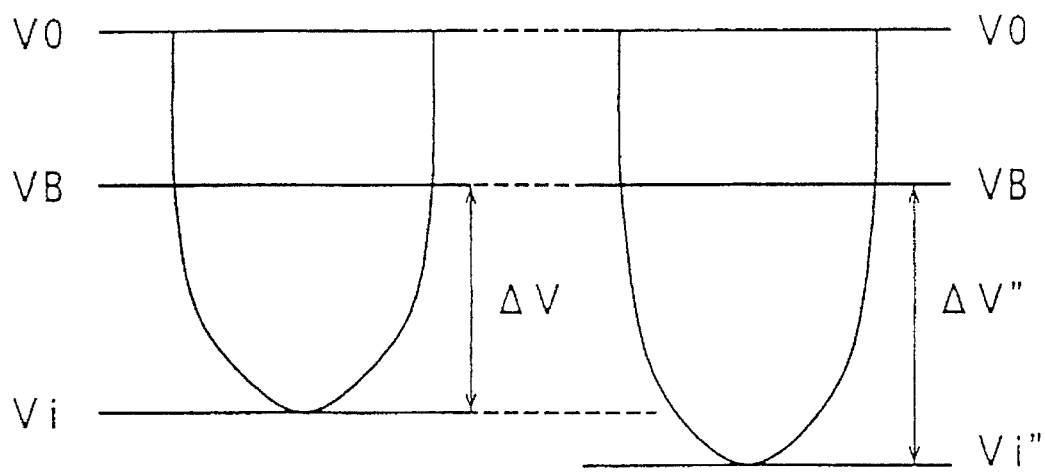
FIG. 13 is a graph showing that the attenuation potential will vary with differences in photoconductor sensitivity even when the charge potential and exposure levels are constant.

However, due to changes in the photoconductor 41 sensitivity or dirtying of the charger 43, the charge potential of the photoconductor 41 may be a potential V0' (<>V0) unequal to the potential V0 corresponding to the grid potential VG as shown in FIG. 12 even through the grid potential is controlled to the rated potential VG.

In this case, even if the surface of the photoconductor 41 charged to potential V0' is exposed with a laser beam set to the standard AIDC light quantity, the attenuation potential (potential of the latent image) will be a potential VI' (<> VI) unequal to the desired potential VI corresponding to the standard light quantity and potential V0.

Because the amount of toner adhesion to the photoconductor 41 is proportional to the difference between the developer potential VB and the attenuation potential, toner adhesion in this case is proportional to developer potential VB—attenuation potential VI' and is unequal to the desired toner adhesion.

The grid potential VG is therefore corrected in the VG correction process S15 so that the charge potential can be set to the desired potential V0.

EXPOSURE CORRECTION PROCESS S17

If the surface of the photoconductor 41 charged to standard potential V0 is exposed with the standard AIDC light quantity, the attenuation potential (latent image potential) should be the desired potential VI corresponding to this charge potential V0 and the standard light quantity.

However, due to environmental factors (temperature, humidity), or other factors such as changes in photoconductor sensitivity due to photoconductor 41 durability (wear), photoconductor 41 exposure under the above conditions may result in the attenuation potential being a potential VI" (<>VI) unequal to the desired potential VI.

Toner adhesion in this case is proportional to developer potential VB—attenuation potential VI" and a difference between actual and desired toner adhesion results.

Figure 14:
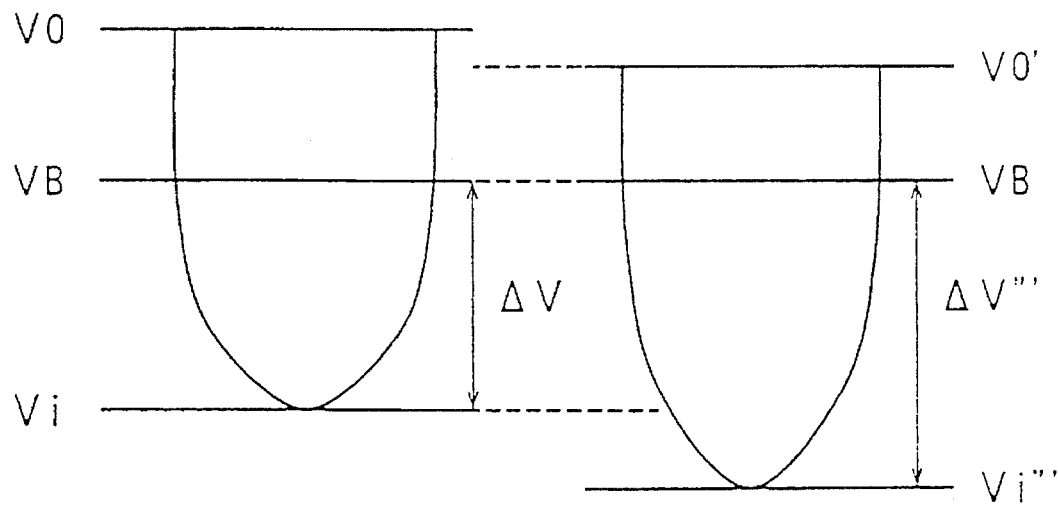
FIG. 14 is a graph showing that the attenuation potential to a constant exposure level will differ further when the conditions of both FIG. 12 and FIG. 13 occur.

The light quantity of the laser beam is therefore corrected in the exposure correction process S17 to cause attenuation to the desired potential VI. The graph in FIG. 14 shows the case when both grid potential VG and light quantity (exposure) correction are required.

POTENTIAL DISTRIBUTION CALCULATION PROCESS S19

Figure 1:
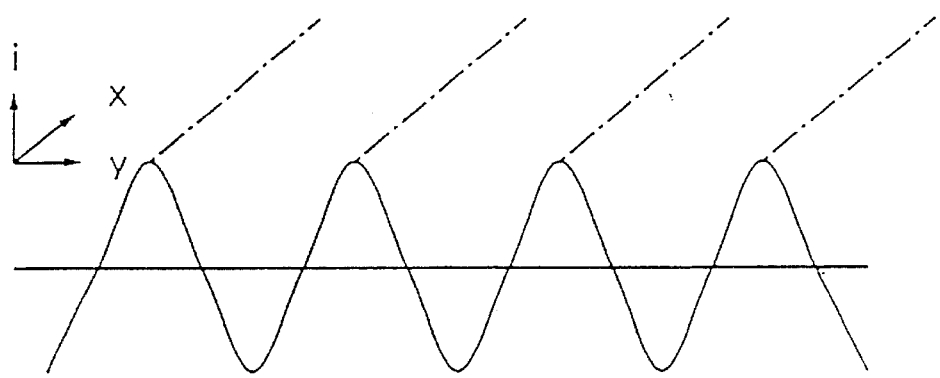
FIG. 1 is a light quantity distribution wave diagram in a light intensity modulation method.
Figure 2:
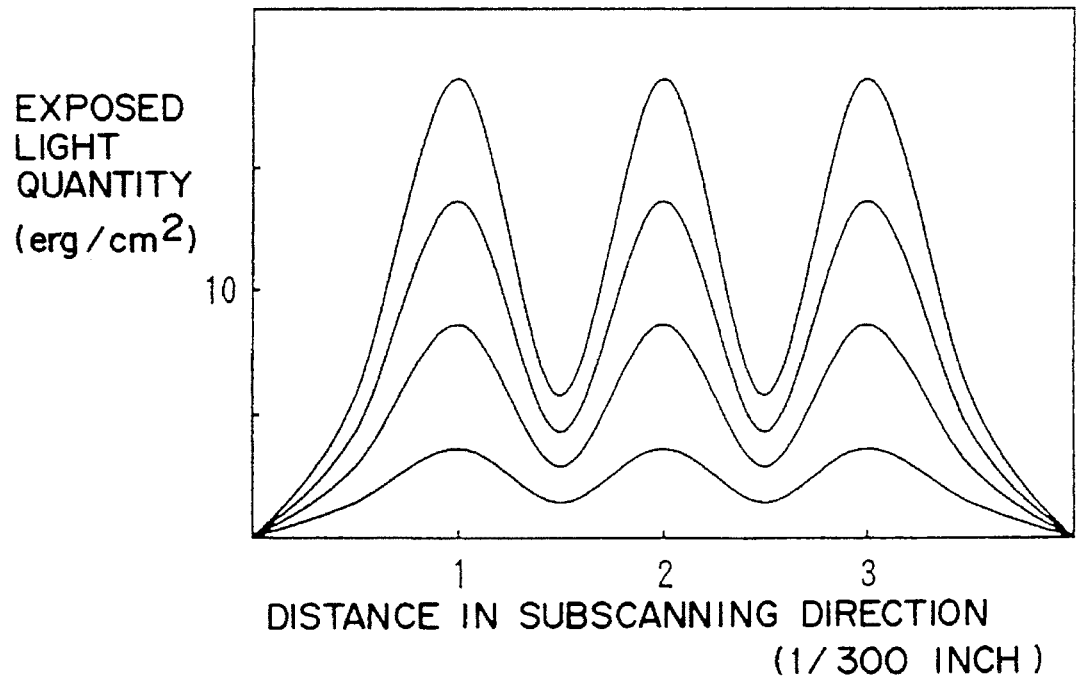
FIG. 2 is a light quantity distribution wave diagram in the subscanning direction in a light intensity modulation method.
Figure 3:
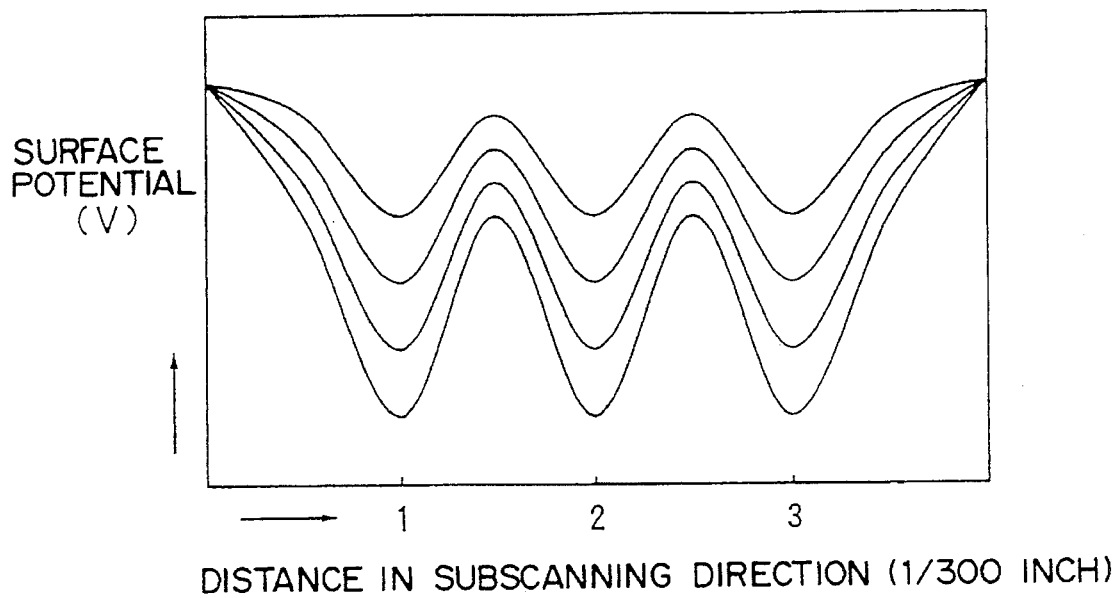
FIG. 3 is a potential distribution wave diagram in the subscanning direction in a light intensity modulation method.
Figure 4:
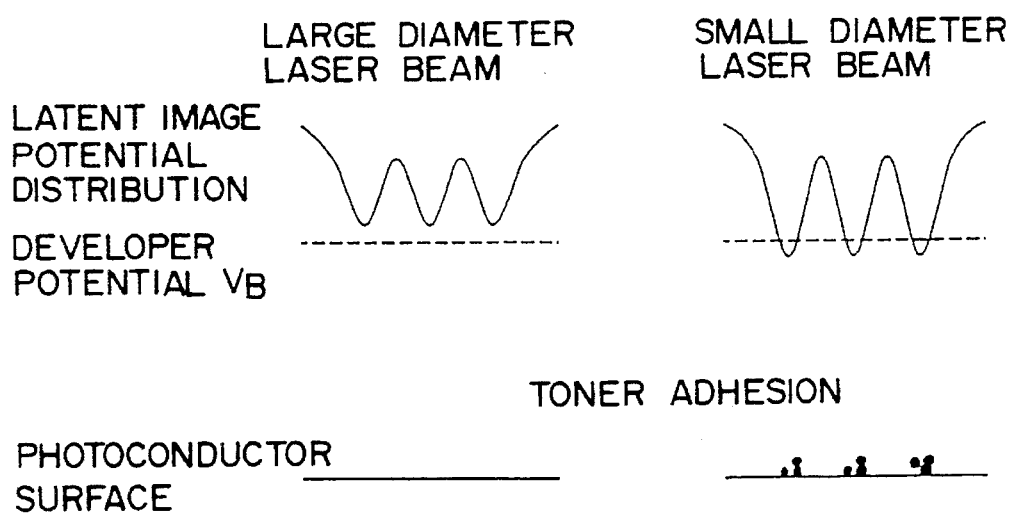
FIG. 4 is a diagram showing the difference in toner adhesion to the photoconductor and the potential distribution of the latent image for large and small diameter laser beams when the image density is low.
Figure 5:
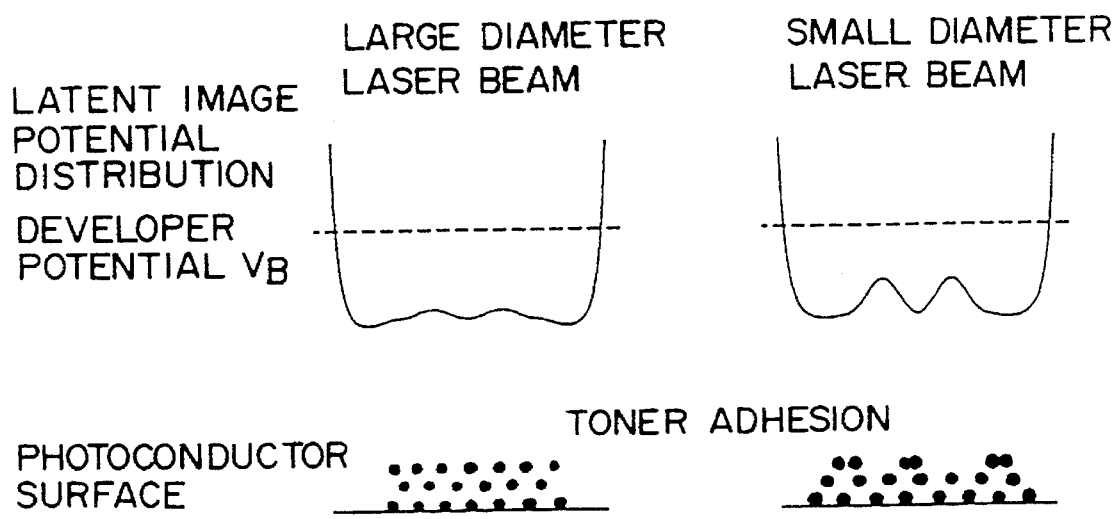
FIG. 5 is a diagram showing the difference in toner adhesion to the photoconductor and the potential distribution of the latent image for large and small diameter laser beams when the image density is high.
Figure 6:
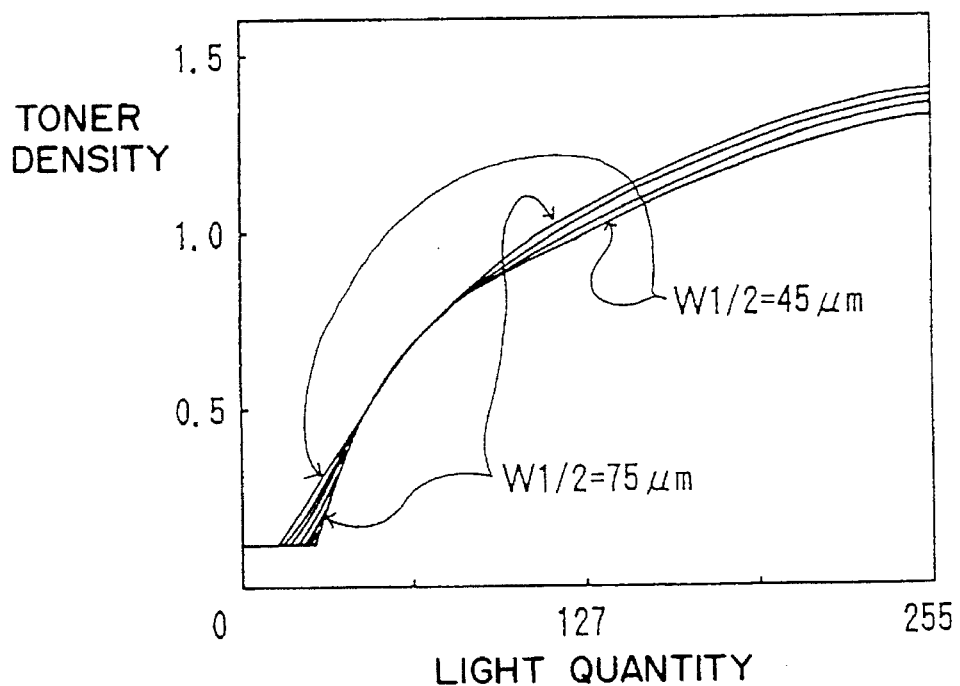
FIG. 6 is a graph of the light quantity and image density characteristics when the laser beam diameter is changed.

As shown in FIG. 6, toner density increases as beam diameter decreases in the low exposure (low image density) region, and toner density increases as beam diameter increases in the high exposure (high image density) region. On the other hand, there occur differences in the explored light diffusion due to the surface condition of the photoconductor and in the charge diffusion due to the surface treatment of the base material. These differences cause a difference in the potential distribution even with an equal beam diameter. There is an error in the gradation reproduction corrected only by the beam diameter.

To compensate for this difference, the potential distribution by the laser beam is calculated in the calculation process S19, and a corresponding group of γ tables is selected.

AIDC OPERATION PROCESS S21

In this process a latent image of standard attenuation potential VI is formed on the surface of the photoconductor, which is uniformly charged to standard charge potential V0 using the corrected grid potential VG, using the corrected light quantity laser beam.

This latent image is then developed to form a visible toner image by the developer unit 45r controlled to the standard developer potential VB, and the density of this standard toner image is detected by the AIDC sensor 210.

The charger 43 grid potential VG, developer unit 45r developer potential VB, and γ table are then selected based on the detected value output from the AIDC sensor 210.

COPY PROCESS S23

The printer controller 201 finally executes the processes required for the copy operation while communicating data with the copier controller 231. During this copy operation, the data selected during the AIDC operation process S21 are used for the charger 43 grid potential VG, developer unit 45r developer potential VB, and γ table.

(III-2) VG Correction Process S15

In the first step in this process the drum drive motor 72 for photoconductor 41 drum drive, and the main motor 73 for transport roller drive are turned ON (S101). The premain/transfer charger eraser is also turned on (S103).

A predetermined detection value is then set as the grid potential VG data (S105). When the charger 43 becomes ON, the grid potential VG is controlled to a value set by the above preset detection value (S107).

The V0 detection enable timer T1 then starts (S109). The value of this timer T1 is set to a period long enough to enable the charge potential of the photoconductor 41 to stabilize after the charger 43 becomes ON.

When the V0 detection enable timer T1 stops (S113 returns YES), the timer T1 is reset (S115). The charge potential of the photoconductor 41 at the position opposite the weak potential sensor 44 is also detected (S117). Detection is executed 50 times (until S119 returns YES), and the average of the 50 detection readings is then substituted as charge potential V0 (S121).

The VG correction table (shown as Table 1 below) is then referenced to obtain the grid potential VG correction quantity ΔVG based on the detected charge potential V0.

TABLE 1

| ΔVG | Potential sensor output (v) | Surface potential at developer position | Surface potential at sensor position |
|---|---|---|---|
| +100 | → 3.54 | → 659 | → 709 |
| +80 | 3.55 → | 660 → | 710 → |
| +60 | 3.65 → | 680 → | 730 → |
| +40 | 3.75 → | 700 → | 750 → |
| +20 | 3.85 → | 720 → | 770 → |
| 0 | 3.95 → | 740 → | 790 → |
| −20 | 4.05 → | 760 → | 810 → |
| −40 | 4.15 → | 780 → | 830 → |

TABLE 1-continued

| ΔVG | Potential sensor output (v) | Surface potential at developer position | Surface potential at sensor position |
|---|---|---|---|
| −60 | 4.25 → | 800 → | 850 → |
| −80 | 4.35 → | 820 → | 870 → |
| −100 | 4.45 → | 840 → | 890 → |

For example, if the average of the fifty weak potential sensor 44 outputs is 3.85–3.95 V, the detection potential V0 at the position opposite the weak potential sensor 44 is 770–790 V. The correction ΔVG required for the grid potential VG corresponding to this 770–790 V detected potential is +20 V.

Figure 15:
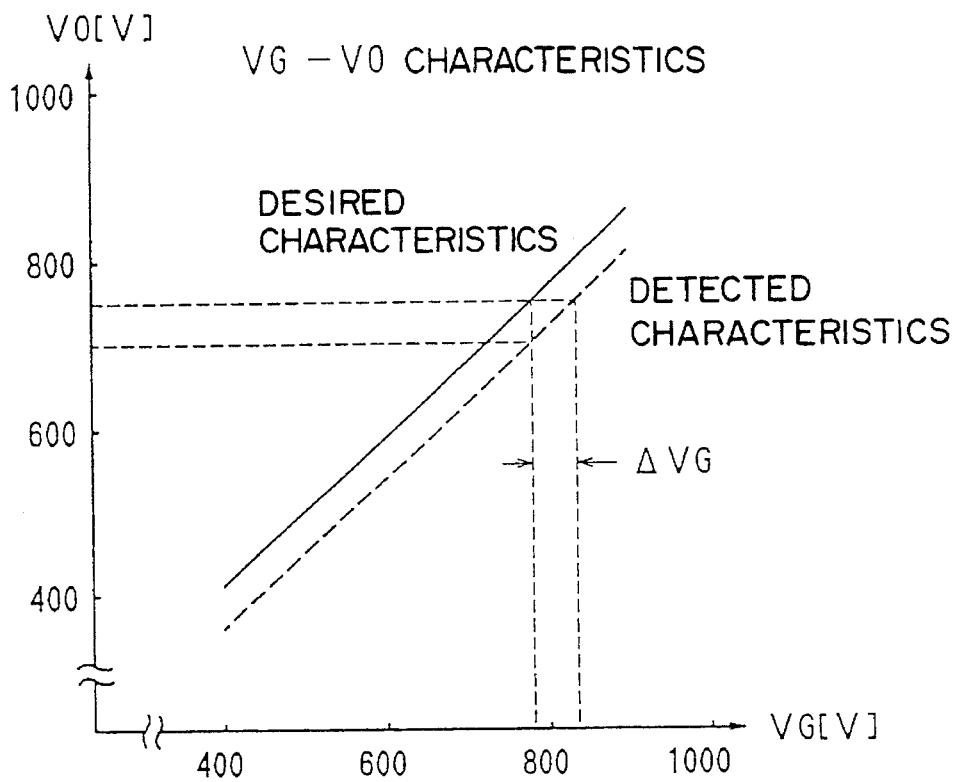
FIG. 15 is a graph showing the relationship between grid potential and charge potential.

Table 1 is compiled based on the VG–V0 characteristics shown in FIG. 15. Specifically, the slopes of the VG and V0 characteristics in the range of possible grid potential VG values in this embodiment are essentially the same. For example, when the detected potential V0 (=detected potential in S121 (=values on dotted line)) corresponding to the set grid potential VG (=grid potential VG set in S105) differ as shown in FIG. 15, the intersection between the value of the charge potential V0 and the detected potential V0 (dotted line) is obtained, and the grid potential corresponding to this point on the detected potential curve is obtained as the grid potential VG after correction. Specifically, the grid potential is corrected by the difference ΔVG. As a result, the surface of the photoconductor 41 can be charged to the desired charge potential V0.

Note that the reason the surface potential at the developer position shown in Table 1 is less than the sensor position surface potential V0 is because the potential attenuates by the time the photoconductor 41 rotates from the position of the weak potential sensor 44 to the position of the developer unit 45r.

Figure 17A:
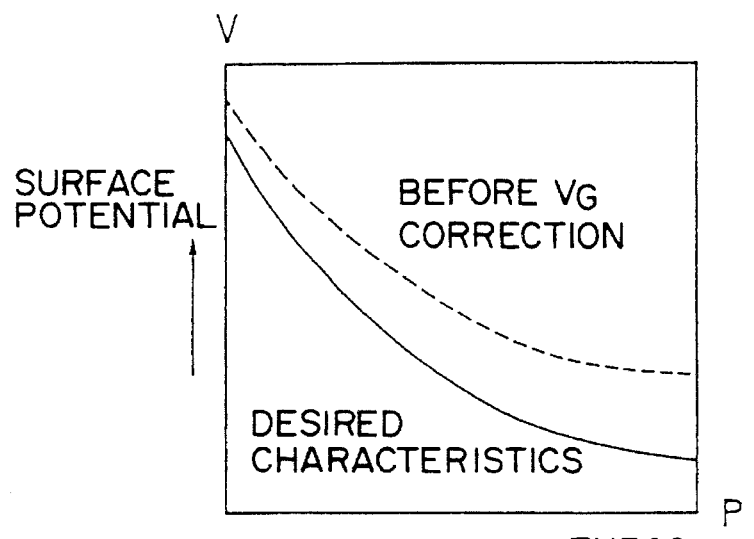
FIGS. 17a, 17b and 17c are graphs showing the light attenuation curve approaching the ideal characteristic curve when grid potential and light quantity correction are applied.
Figure 17B:
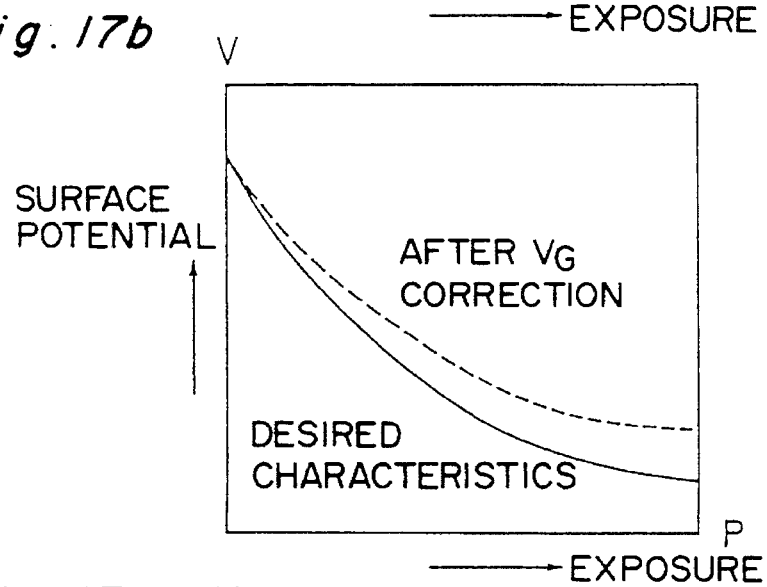

The calculated potential ΔVG is assigned as data 1 (S125), and this data 1 value is added to the existing VG value to set the new grid potential VG value (S127). As a result, the light attenuation curve LDC approaches the desired characteristic (solid line) as indicated by the dotted lines in FIGS. 17a and 17b.

(III-3) Exposure Correction Process S17

Figure 11:
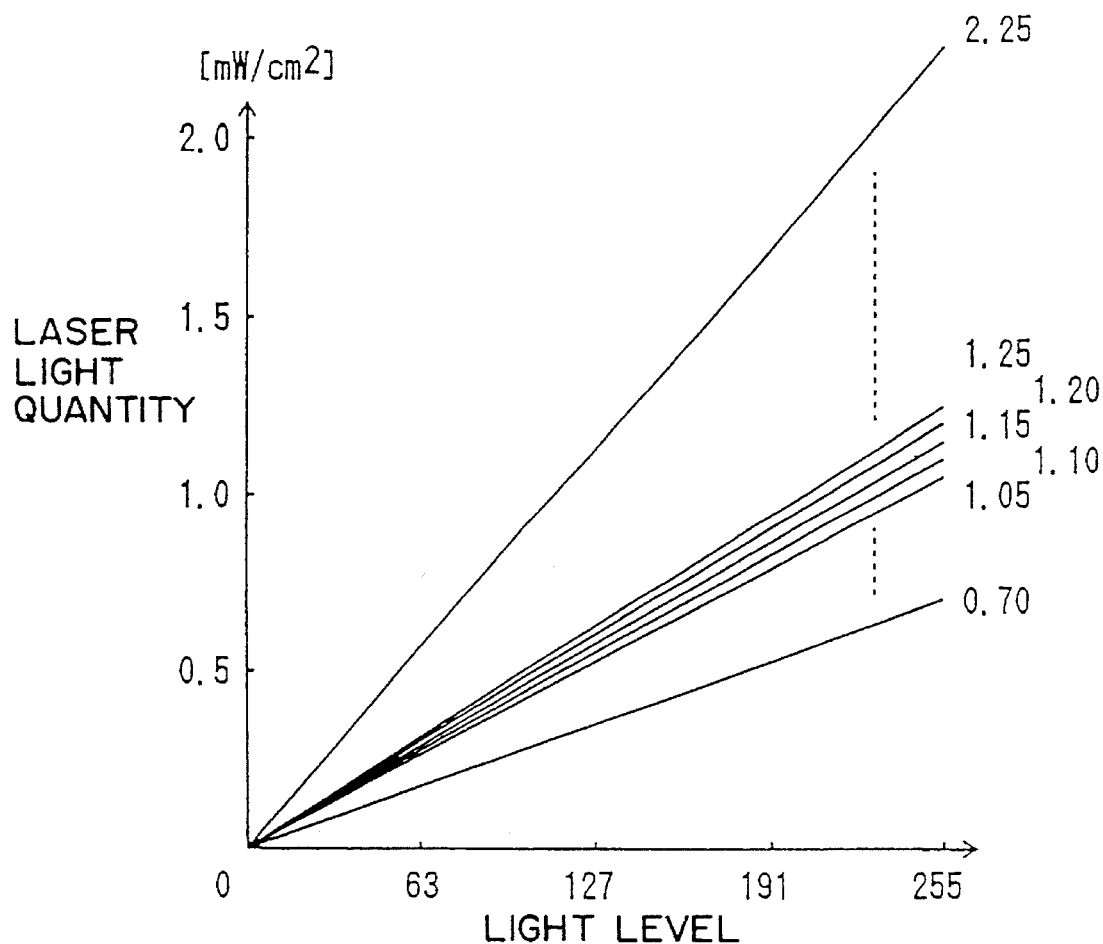
FIG. 11 is a graph of 256 gradation light quantity levels at the maximum light quantity level.

First, a known, predetermined light quantity data is set as the light quantity data for detection (S201). One of the light quantity levels from 0.70–2.25 (mW/cm$^2$) preset in 0.05 mW/cm$^2$ intervals as shown in FIG. 11 is selected as the maximum output light quantity, and when this selected maximum output light quantity matches the highest (level 255) of the 256 gradation levels (levels 0–255), a level in the middle of this range is selected and set as the light quantity data for detection (S201).

For example, the light quantity at level 64 is used when the maximum light quantity is set to 1.15 mW/cm$^2$.

The laser diode 264 is then turned ON at this new known light output level, i.e., light quantity level 64 when the maximum emission level is 1.15 mW/cm$^2$.

The Vi detection enable timer T2 is then started (S205). The value of this timer T2 is set to the time required for the part of the photoconductor 41 where the charge potential V0 at the corrected grid potential VG is attenuated by exposure to the laser turned on in step S203 to reach the position of the weak potential sensor 44.

When this Vi detection enable timer T2 stops (S209 returns YES), the timer T2 is reset (S211). The potential of the photoconductor 41 at the point opposite the weak potential sensor 44 is also detected (S213). In other words, the potential (attenuated potential) of the latent image formed by exposure at step S203 is detected in step S213.

Detection is executed fifty times (until S215 returns YES), and the average of the fifty detection readings is then obtained and substituted as attenuated potential Vi (S217).

The light quantity correction table shown as Table 2 below is referenced, and the maximum light quantity corresponding to attenuated potential Vi is calculated as light quantity data LD (S219).

For example, if the average of the fifty weak potential sensor 44 outputs is 2.025–2.10 V, the detected potential (attenuated potential) Vi at the position opposite the weak potential sensor 44 is 405–420 V. The maximum light quantity corresponding to this detected potential (attenuated potential) Vi (=405–420 V) will be 1.05 mW/cm$^2$.

Note that the developer position surface potential shown in Table 2 drops below the sensor position surface potential Vi because the potential attenuates during the time required for the photoconductor 41 to turn from the weak potential sensor 44 position to the developer unit 45r position.

Figure 16:
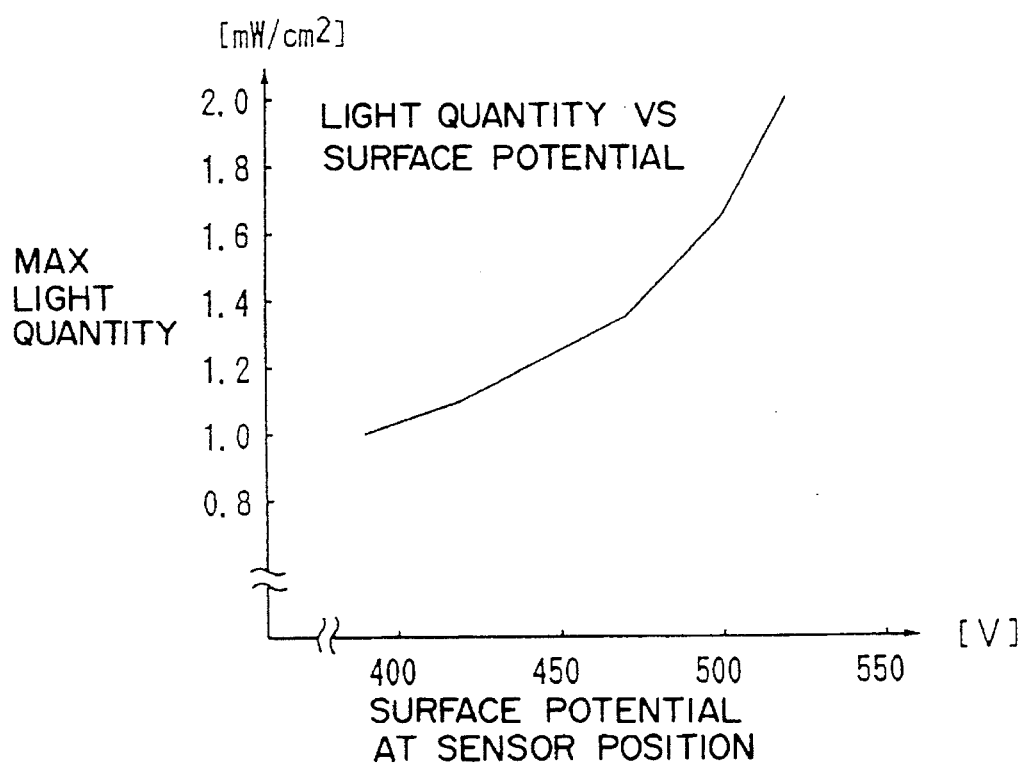
FIG. 16 is a graph showing the relationship between surface potential and maximum light quantity.

Note also that Table 2 is compiled based on the relationship between the attenuated potential Vi detected by the weak potential sensor 44 and the maximum light quantity setting as shown in FIG. 16.

Figure 17C:
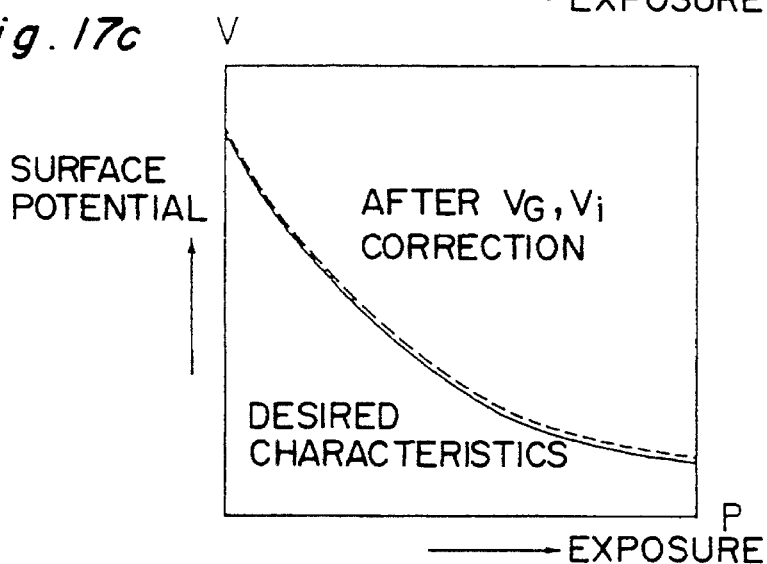

The light quantity data LD calculated as described above is set next in step S221. As a result, the light attenuation curve LDC becomes nearly identical to the desired characteristic (solid line) as shown by the dotted line in FIGS. 17b and 17c.

TABLE 2

| No. | Potential sensor output (v) | Surface potential VB at developer position | Surface potential ViA at sensor position | Max. light quantity (mW/cm$^2$) |
|---|---|---|---|---|
| 0 | → 1.84 | → 339 | → 369 | 0.90 |
| 1 | 1.85 → | 340 → | 370 → | 0.95 |
| 2 | 1.95 → | 360 → | 390 → | 1.00 |
| 3 | 2.025 → | 375 → | 405 → | 1.05 |
| 4 | 2.10 → | 390 → | 420 → | 1.10 |
| 5 | 2.15 → | 400 → | 430 → | 1.15 |
| 6 | 2.20 → | 410 → | 440 → | 1.20 |
| 7 | 2.25 → | 420 → | 450 → | 1.25 |
| 8 | 2.30 → | 430 → | 460 → | 1.30 |
| 9 | 2.35 → | 440 → | 470 → | 1.35 |
| 10 | 2.40 → | 450 → | 480 → | 1.45 |
| 11 | 2.45 → | 460 → | 490 → | 1.55 |
| 12 | 2.50 → | 470 → | 500 → | 1.65 |
| 13 | 2.55 → | 480 → | 510 → | 1.80 |
| 14 | 2.575 → | 485 → | 515 → | 1.90 |
| 15 | 2.60 → | 490 → | 520 → | 2.00 |

(III-4) Electric Potential Distribution Calculation Process; S19

The first step is to set the light quantity for the level at the middle of the corrected light quantity data LD range; in this example, the light quantity of level 64 is set. Specifically, the light quantity of the median level is set because the slope of the light attenuation curve LDC is greatest at median exposure levels as shown in FIG. 20. Note, also, that a code is assigned to each maximum light quantity level as shown in Table 3.

TABLE 3

| No. | Step 0 | 1 | 2 | 3 | 4 | Output laser power (mW/cm²) |
|---|---|---|---|---|---|---|
| 0 | 0 | 0 | 0 | 0 | 0 | 0.70 |
| 1 | 1 | 0 | 0 | 0 | 0 | 0.75 |
| 2 | 0 | 1 | 0 | 0 | 0 | 0.80 |
| 3 | 1 | 1 | 0 | 0 | 0 | 0.85 |
| 4 | 0 | 0 | 1 | 0 | 0 | 0.90 |
| 5 | 1 | 0 | 1 | 0 | 0 | 0.95 |
| 6 | 0 | 1 | 1 | 0 | 0 | 1.00 |
| 7 | 1 | 1 | 1 | 0 | 0 | 1.05 |
| 8 | 0 | 0 | 0 | 1 | 0 | 1.10 |
| 9 | 1 | 0 | 0 | 1 | 0 | 1.15 |
| 10 | 0 | 1 | 0 | 1 | 0 | 1.20 |
| 11 | 1 | 1 | 0 | 1 | 0 | 1.25 |
| 12 | 0 | 0 | 1 | 1 | 0 | 1.30 |
| 13 | 1 | 0 | 1 | 1 | 0 | 1.35 |
| 14 | 0 | 1 | 1 | 1 | 0 | 1.40 |
| 15 | 1 | 1 | 1 | 1 | 0 | 1.45 |
| 16 | 0 | 0 | 0 | 0 | 1 | 1.50 |
| 17 | 1 | 0 | 0 | 0 | 1 | 1.55 |
| 18 | 0 | 1 | 0 | 0 | 1 | 1.60 |
| 19 | 1 | 1 | 0 | 0 | 1 | 1.65 |
| 20 | 0 | 0 | 1 | 0 | 1 | 1.70 |
| 21 | 1 | 0 | 0 | 0 | 1 | 1.75 |
| 22 | 0 | 1 | 1 | 0 | 1 | 1.80 |

TABLE 3-continued

| No. | Step 0 | 1 | 2 | 3 | 4 | Output laser power (mW/cm²) |
|---|---|---|---|---|---|---|
| 23 | 1 | 1 | 1 | 0 | 1 | 1.85 |
| 24 | 0 | 0 | 0 | 1 | 1 | 1.90 |
| 25 | 1 | 0 | 0 | 1 | 1 | 1.95 |
| 26 | 0 | 1 | 0 | 1 | 1 | 2.00 |
| 27 | 1 | 1 | 0 | 1 | 1 | 2.05 |
| 28 | 0 | 0 | 1 | 1 | 1 | 2.10 |
| 29 | 1 | 0 | 1 | 1 | 1 | 2.15 |
| 30 | 0 | 1 | 1 | 1 | 1 | 2.20 |
| 31 | 1 | 1 | 1 | 1 | 1 | 2.25 |

Figure 18A:
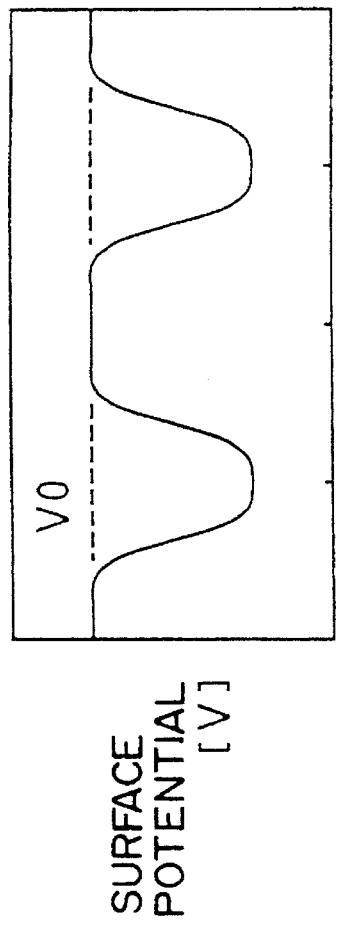
FIGS. 18a and 18b are graphs showing a potential distribution wave diagram in the subscanning direction after laser beam scanning.
Figure 18B:
Figure 21B:
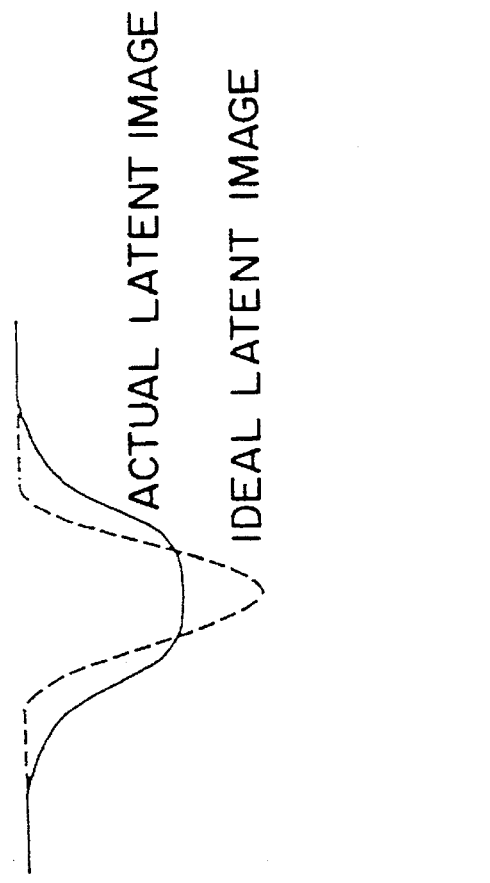
FIGS. 21a and 21b are graphs showing the relationship between laser light quantity and attenuation potential.
Figure 21A:
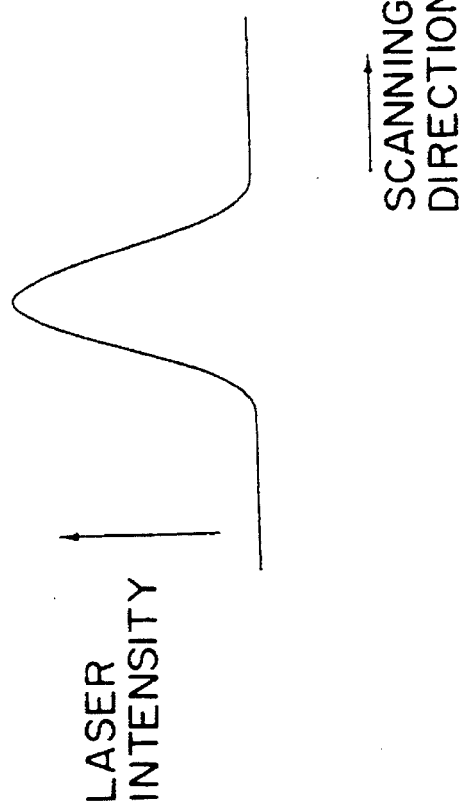

The laser emission timing is then selected. The laser emission timing may be changed, for example, so that the laser emits every other dot in the subscanning direction. This results in the potential valleys as shown in FIG. 18a. Note that the laser may emit once every four dots, resulting in potential values as shown in FIG. 18b.

The potential distribution detection enable timer T3 is then started (S305). This timer T3 value is set to the time required for the part of the photoconductor 41 where the charge potential V0 at the corrected grid potential VG is attenuated by the laser switching on/off (S303) at the set emission level (S301) to reach the position of the weak potential sensor 44.

When this potential distribution detection enable timer T3 stops (S309 returns YES), the timer T3 is reset (S311). The potential of the photoconductor 41 at the point opposite the weak potential sensor 44 is also detected (S313), and when potential detection is completed, the detection result is stored (S317).

The next step is to calculate the maximum value (valley) and the minimum value (summit) of the potential distribution detected as above and is then to obtain the difference, $\Delta Vs$. (S319).

The next step is to select a number from numbers GM1–GM7 in Table 4. Each of the numbers GM1–GM7 represent a gradation correction data table group corresponding to the above potential difference $\Delta Vs$. As the potential difference $\Delta Vs$ increases, the table number also increases. In other words, Table 4 shows the correspondence between various ranges of potential difference $\Delta Vs$ and various gradation correction data table groups. It is noted that Table 4 is obtained by calculating the gradation variation upon change of the potential difference $\Delta Vs$. The selected table number is used as the gradation correction data table group GM (S327).

TABLE 4

| $\Delta Vs$ in potential distribution | →→5 V | →15 V | →25 V | →35 V | →45 V | →55 V | →65 V |
|---|---|---|---|---|---|---|---|
| Gradation correction Table No. GM | GM1 | GM2 | GM3 | GM4 | GM5 | GM6 | GM7 |

The selected gradation correction data table group GM is used as the γ table selection data (S329).

(III-5) AIDC Operation Process S21

The first step in this process is to detect the density of the undeveloped photoconductor 41 (the density with no toner adhesion) by means of the AIDC sensor 210 (S401).

The photoconductor 41 is then charged at the maximum grid potential VG and exposed at the maximum light quantity, and the density of the toner image (solid cyan image) developed at the maximum developer potential VB using cyan toner is detected by the AIDC sensor 210 (S403). This density level is the saturation level for the AIDC sensor 210 output.

Sensor sensitivity is then obtained based on the difference between the detection values returned in steps S401 and S403, and sensor sensitivity correction is applied as needed.

The cyan half-tone density is then detected (S405).

In other words, the grid potential VG is corrected by the grid potential VG correction process, the photoconductor 41 surface is charged using the corrected grid potential VG, and the charged surface is exposed by a laser beam controlled to a median value (e.g., the level 80 of optimum sensor sensitivity) of the maximum exposure level after light quantity correction. The latent image formed by exposure is developed by a developer unit set to the specified developer potential VB to form a toner image, and the density (toner adhesion) of this toner image is detected by the AIDC sensor 210. Toner adhesion (toner density) is calculated based on the difference between direct and diffused reflected light detected by the AIDC sensor 210.

The density of the magenta, yellow, and black half-tone images is also detected as described above (steps S407, 409, 411).

TABLE 5

| LBA | Toner adhesion (mW/cm$^2$) | VG (v) | VB (V) | Gradation correction Table | | | | |
|---|---|---|---|---|---|---|---|---|
| | | | | GM1 | GM2 | — | GM6 | GM7 |
| 0 | 0.625 | (3) 500 | (3) 280 | T0 | T0 | — | T0 | T0 |
| 1 | 0.511 | (5) 540 | (5) 320 | T1 | T2 | — | T1 | T1 |
| 2 | 0.455 | (7) 570 | (7) 345 | T2 | T3 | — | T2 | T2 |
| 3 | 0.410 | (9) 600 | (9) 370 | T3 | T3 | — | T3 | T3 |
| 4 | 0.385 | (11) 630 | (11) 390 | T4 | T4 | — | T4 | T4 |
| 5 | 0.345 | (13) 660 | (13) 420 | T5 | T5 | — | T5 | T5 |
| 6 | 0.310 | (15) 700 | (15) 450 | T6 | T6 | — | T6 | T6 |
| 7 | 0.280 | (17) 740 | (17) 490 | T7 | T7 | — | T7 | T7 |
| 8 | 0.260 | (19) 780 | (19) 520 | T8 | T8 | — | T8 | T8 |
| 9 | 0.240 | (21) 830 | (21) 560 | T9 | T9 | — | T9 | T9 |
| 10 | 0.210 | (23) 900 | (23) 620 | T10 | T10 | — | T10 | T10 |
| 11 | 0.180 | (25) 1000 | (25) 710 | T11 | T11 | — | T11 | T11 |

When the density of each color half-tone has been detected, the AIDC table is selected (S413). More specifically, the data (VG, VB, g) corresponding to the level LBA of each color toner adhesion quantity is selected from Table 5. The γ value (gradation correction table) is selected from among the data table group GM selected in the electric potential distribution calculation process. Note also that VG and VB are negative values, but are expressed as absolute values in Table 5.

Figure 7:
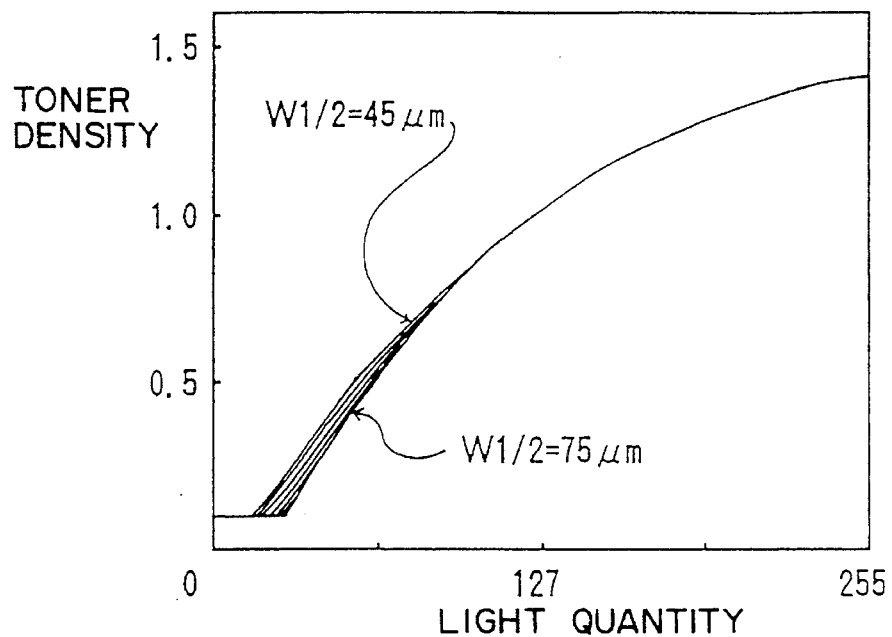
FIG. 7 is a graph of the light quantity and image density characteristics when the laser beam diameter is changed with the maximum toner density controlled by AIDC to a constant level.

The copy process (S23, FIG. 7) is then executed based on this selected data. The charge potential V0 and developer potential VB are controlled according to the density values detected in steps S405–S411 while holding the difference between the grid potential VG (charge potential V0) and the developer potential VB within a predetermined range because carrier adhesion and toner ghosting<?> occur when the difference between the grid potential VG (charge potential V0) and the developer potential VB exceeds this range. In addition, the toner adhesion quantity of the reversing developer system is proportional to the difference between developer potential VB and attenuated potential Vi, and the toner density can therefore be controlled as described above.

Image stabilization control processes are executed in the above embodiment each time before each copy operation, but execution at each copy operation is not necessary. For example, the number of copies or the total copy time can be counted to run this process at every predetermined number of copies or total copy time, or the environmental changes (temperature, humidity) can be monitored to execute the image stabilization process when the variance exceeds a predetermined threshold value. In addition, the charge potential V0 is controlled by the grid potential VG, but another control method can also be used.

An electric potential distribution detection apparatus according to the present invention detects the electric potential by means of the laser beam exposure and obtains the potential difference ΔVs between the max. value (valley) and the min. value (summit) in the electric potential distribution. In an electric potential distribution detection apparatus according to the present invention, the γ correction table group (gradation correction data tables) corresponding to the potential difference ΔVs detected by the electric potential distribution detection apparatus is selected, and image density is controlled by referencing these data tables.

As a result, it is possible to compensate for differences in the potential distribution of the latent image caused by a difference in the light diffusion due to the surface condition or a difference in the charge diffusion caused by the surface treatment of the base material, which result from variations in the photoconductor manufacturing process, environmental conditions (temperature, humidity), and simple photoconductor deterioration over time, in the sensitivity of individual photoconductors while the diameter of the output laser beam remains constant. As a result, it is possible to compensate for changes in gradation characteristics resulting from differences in this potential distribution, and a consistently good gradation display can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In an image density control apparatus having a laser emitter for emitting a selected light quantity to form a standard latent image on a photoconductor surface charged to a uniform electric potential by a charger having a selected grid potential, a developer having a selected developer potential for developing a toner image from the latent image, a detector for detecting a density of said standard toner image, and a controller for controlling said selected grid potential and said selected developer potential according to the density of said standard toner image to optimize the image density during a final imaging process, said apparatus comprising:

forming means, by a scanning of said laser beam, for forming said latent image having an electric potential distribution on said photoconductor surface previously charged uniformly;

detection means for detecting said electric potential distribution of said latent image;

calculation means for calculating potential conditions based on the result obtained by said detection means;

memory means for storing gradation correction table groups corresponding to each of said potential conditions, each of said gradation correction table groups including a plurality of gradation correction tables which respectively corresponds to the density of the standard toner image;

first selection means for selecting a gradation correction table group in accordance with the electric potential conditions calculated by said calculation means; and second selection means for selecting from said selected gradation correction table group a gradation correction table in accordance with the density of the standard toner image.

2. An image density control apparatus for controlling an image density on a photoconductor surface, comprising:

charging means for charging said photoconductor surface uniformly;

forming means, by a scanning of a laser beam from a laser source, for forming a standard latent image having an electric potential distribution on said photoconductor surface;

first detection means for detecting an electric potential distribution of said standard latent image;

developing means for developing a standard toner image from said standard latent image;

second detection means for detecting a density of said standard toner image; and selection means for selecting a gradation correction table in accordance with the detected electric potential distribution and the detected density.

3. An image density control apparatus as claimed in claim 2, wherein said selection means comprises:

first selection means for selecting a gradation correction table group in accordance with the electric potential distribution; and second selection means for selecting from said selected gradation correction table group a gradation correction data in accordance with the detected density.

4. An image density control apparatus as claimed in claim 2, wherein said charging means has a grid potential control means for controlling a grid potential to a selected potential.

5. An image density control apparatus as claimed in claim 4, wherein said grid potential is controlled relatively to said detected density.

6. An image density control apparatus as claimed in claim 2, wherein said developing means has a developer potential control means for controlling a developer potential to a selected potential.

7. An image density control apparatus as claimed in claim 6, wherein said developer potential is controlled relatively to said detected density.

8. An image density control apparatus as claimed in claim 2, further comprising laser control means for controlling a light quantity of said laser source based on an image data corrected by said selected gradation correction table.

9. A method for controlling an image density on a photoconductor surface by selecting a gradation table from a plurality of gradation tables stored in a memory comprising the steps of:

charging said photoconductor surface uniformly;

forming, by scanning a laser beam, a latent image having an electric potential distribution on said uniformly charged photoconductor surface;

detecting said electric potential distribution of said latent image;

calculating an electric potential difference between a maximum electric potential and a minimum electric potential in the electric potential distribution;

determining a relationship between density of an image and the gradation tables in accordance with said electric potential difference;

charging said photoconductor surface uniformly again;

forming, by the scanning of the laser beam, a standard latent image;

developing said standard latent image;

detecting a density of said developed standard toner image; and selecting a gradation correction table in accordance with the density of the standard toner image by using the determined relationship.

* * * * *